US00RE38087E

(19) United States
(12) Reissued Patent
Yokoe et al.

(10) Patent Number: US RE38,087 E
(45) Date of Reissued Patent: Apr. 22, 2003

(54) FUEL HOSE AND METHOD OF ITS PRODUCTION

(75) Inventors: Katsuhiko Yokoe, Nagoya (JP); Kazuhiro Kato, Nagoya (JP); Koyo Murakami, Nagoya (JP); Eiichi Daikai, Inuyama (JP); Hiroaki Ito, Kasugai (JP)

(73) Assignee: Tokai Rubber Industries, Ltd., Komaki (JP)

(21) Appl. No.: 09/506,201

(22) PCT Filed: Sep. 9, 1994

(86) PCT No.: PCT/JP94/01501

§ 371 (c)(1), (2), (4) Date: May 9, 1995

(87) PCT Pub. No.: WO95/07176

PCT Pub. Date: Mar. 16, 1995

Related U.S. Patent Documents

Reissue of:
(64) Patent No.: 5,718,957
Issued: Feb. 17, 1998
Appl. No.: 08/424,469
Filed: May 9, 1995

(30) Foreign Application Priority Data

| | | |
|---|---|---|
| Sep. 10, 1993 | (JP) | 5-225980 |
| Nov. 12, 1993 | (JP) | 5-307414 |
| Dec. 3, 1993 | (JP) | 6-339245 |

(51) Int. Cl.[7] ..... B29D 23/00

(52) U.S. Cl. ..... 428/36.91; 428/34.5; 428/34.7; 428/36.2; 428/475.8; 427/536; 427/539; 138/118.1; 138/125.7; 156/244.13; 156/244.17; 156/244.23; 156/244.24

(58) Field of Search ..... 428/36.9, 36.91, 428/34.5, 34.7, 36.2, 475.8; 427/536, 539; 138/118.1, 125.7; 156/244.13, 244.23, 244.24, 272.6, 244.17

(56) References Cited

U.S. PATENT DOCUMENTS

| | | | |
|---|---|---|---|
| 3,865,074 | A | 2/1975 | Cornelissen et al. |
| 3,945,966 | A | 3/1976 | Vicic et al. |

(List continued on next page.)

FOREIGN PATENT DOCUMENTS

| | | |
|---|---|---|
| DE | 4310159 | 10/1993 |
| EP | 0 385 731 | 9/1990 |

(List continued on next page.)

*Primary Examiner*—Rena Dye
(74) *Attorney, Agent, or Firm*—Armstrong, Westerman & Hattori, LLP

(57) ABSTRACT

The fuel hose of this invention is a fuel hose comprising a tubular fluororesin inner ply and, as laminated onto the peripheral surface thereof, a thermoplastic resin or rubber outer ply, the tubular fluororesin inner ply having been molded from a fluororesin with an F/C ratio, i.e. ratio of the number of fluorine atoms (F) to the number of carbon atoms (C), of not greater than 1.6 and the peripheral surface layer of the fluororesin inner ply having been modified into the following treated layer (A).

(A) a layer with a distribution of oxygen atoms and having an F/C ratio, i.e. ratio of the number of fluorine atoms (F) to the number of carbon atoms (C), of not greater than 1.12 and an O/C ratio, i.e. ratio of the number of oxygen atoms (O) to the number of carbon atoms (C), of not less than 0.08.

In this fuel hose of the invention, the treated layer (A) of the tubular fluororesin inner ply has a remarkably increased adhesive affinity for thermoplastic resin and rubber, with the result that the bond strength between the tubular fluororesin inner ply and the thermoplastic resin or rubber outer layer is as high as not less than 1.2 N/mm.

22 Claims, 10 Drawing Sheets

U.S. PATENT DOCUMENTS

| | | | | |
|---|---|---|---|---|
| 4,147,824 | A | | 4/1979 | Dettmann et al. |
| 4,330,017 | A | | 5/1982 | Satoh et al. |
| 4,383,131 | A | | 5/1983 | Calburn |
| 4,735,996 | A | | 4/1988 | Nagai et al. |
| 4,740,562 | A | | 4/1988 | Memke et al. |
| 4,879,176 | A | | 11/1989 | Ouderkirk et al. |
| 4,905,735 | A | | 3/1990 | Akiyoshi |
| 5,081,326 | A | | 1/1992 | Usui et al. |
| 5,087,514 | A | | 2/1992 | Graefe |
| 5,093,166 | A | | 3/1992 | Nishimura |
| 5,254,372 | A | | 10/1993 | Nichols |
| 5,262,219 | A | | 11/1993 | Yamamoto et al. |
| 5,271,977 | A | | 12/1993 | Yoshikawa et al. |
| 5,356,681 | A | | 10/1994 | Ichikawa et al. |
| 5,441,782 | A | | 8/1995 | Kawashima et al. |
| 5,500,257 | A | | 3/1996 | Krause et al. |
| 5,554,425 | A | | 9/1996 | Krause et al. |
| 5,759,329 | A | * | 6/1998 | Krause et al. ..... 156/244.13 |

FOREIGN PATENT DOCUMENTS

| | | |
|---|---|---|
| EP | 0 479 592 A2 | 4/1992 |
| EP | 0 551 094 | 7/1993 |
| EP | 582301 | 2/1994 |
| GB | 1 094 785 | 12/1967 |
| GB | 1 432 824 | 4/1976 |
| JP | 5 245989 | 9/1993 |

* cited by examiner

FUEL HOSE AND METHOD OF ITS PRODUCTION

Matter enclosed in heavy brackets [ ] appears in the original patent but forms no part of this reissue specification; matter printed in italics indicates the additions made by reissue.

TECHNICAL FIELD

This invention relates to a fuel hose for use in the fuel system of a motor vehicle or other equipment, particularly a fuel hose consisting of a tubular fluororesin inner ply and a thermoplastic resin or rubber outer ply with a high inter-ply bond strength, a method of producing it, and a vacuum plasma apparatus for use in said method.

PRIOR ART

Generally the fuel hoses used in the fuel systems of cars and other equipment have multi-ply structures consisting of various rubber and resin plies or layers. Among such multi-ply fuel hoses, the two-ply fuel hose consisting of a tubular fluororesin inner ply and a thermoplastic resin or rubber outer ply laminated on the peripheral surface of said tubular inner ply is in prevalent use. The rationale is that, being not only resistant to the common corrosive agents such as chemicals and gasoline but also resistant to the sour gasoline which forms on oxidation of gasoline (sour gasoline resistance), fluororesin is generally regarded as the optimal molding material for the inner ply of the hose which is directly exposed to the fuel. The thermoplastic resin or other outer ply mentioned above is provided as a reinforcing member of the hose for imparting wear resistance and other dynamic characteristics to the fuel hose.

In the manufacture of a fuel hose of the above-mentioned structure, an inner ply made of a special fluororesin, rather than a ply of ordinary fluororesin, which has a modified surface for lamination with said thermoplastic resin or other outer ply is employed. The reason for this is that because the bonding affinity of ordinary fluororesin for other structural materials is very low, said two plies cannot be firmly bonded using an adhesive alone. The fuel hose, in particular, is required to have an initial bond strength (bond strength prior to use) value of not less than 1.2 N/mm which is higher than the bond strength required of the ordinary resin hose. This is because, as far as the fuel hose for use typically in the fuel system of a motor vehicle is concerned, unless it has an initial bond strength value not below the above-mentioned level under the service conditions where a fuel such as gasoline flows down it, there is the risk of partial delamination of the tubular fluororesin inner ply from the outer ply. In the event such a partial exfoliation of the tubular fluororesin inner ply takes place, the tubular fluororesin inner ply may collapse in the vicinity of delamination so that its tubular (hollow) structure is no longer preserved but is occluded to prevent a smooth flow of gasoline or other fuel.

As examples of said surface-modified fluorine-containing resins, the following three (two) fluororesins are known.

(1) A fluororesin material whose surface has been etched with a sodium metal complex (e.g. one described in Ind. Eng. Chem., 50, 329, 1958)

(2) a fluororesin material whose surface has been roughened by sputtering (e.g. one described in JP Publication S-58-25742).

However, the above surface-modified fluororesin materials have various disadvantages. Thus, the fuel hose fabricated using the first-mentioned fluororesin (1) having a sodium metal complex-modified surface suffers aging in adhesion. This loss of adhesion is particularly remarkable when the hose is exposed to ultraviolet radiation. Moreover, since the above surface modification with a sodium metal complex requires the step of immersing fluororesin in a solution of the sodium metal complex and subsequently washing it, this technology has the drawback of being a time-consuming, complicated process. Moreover, the sodium metal complex solution is hazardous to health.

The latter fluororesin having a sputtered surface (2) does not provide for sufficient adhesion when the flowability of the adhesive is low and has the additional disadvantage that the recesses and projections formed by sputtering are easily evened out by friction. Therefore, in the manufacture of a fuel hose using the sputtered fluororesin material, its handling calls for sufficient care and this consideration detracts from the efficiency of production of the fuel hose.

Furthermore, these prior art fluororesins have the common problem that they provide for only poor adhesion when a thermoplastic resin or the like is directly bonded thereto without the aid of an adhesive. For the manufacture of a fuel hose using a fluororesin and a thermoplastic resin such as polyamide resin, not only the above-mentioned method of bonding the two resins with an adhesive but, at least theoretically, the method of heating the thermoplastic resin to achieve the necessary fusion can be employed. According to the latter thermal fusion technique, the step for application and drying of the adhesive can be dispensed with to reduce the production sequence and, in addition, since an organic solvent for dissolving the adhesive is not required, a safer working environment can be insured. Actually, however, the conventional surface-modified fluororesin materials provide for only poor adhesion by the thermal fusion technique, with the result that the above-mentioned inherent advantages of the technique cannot be exploited.

Meanwhile, paying attention to the atomic composition of the surface layer of a fluororesin, a fluororesin material having an adhesion-expressing atomic composition in the surface layer has been proposed (JP Publication H-2-54848). To be specific, the surface of a specified fluororesin is modified to bring the F/C ratio, i.e. ratio of the number of fluorine atoms (F) to the number of carbon atoms (C) and the O/C ratio, i.e. ratio of the number of oxygen atoms (O) to the number of carbon atoms (C), into specified ranges, respectively. With this surface-modified fluororesin, the above-mentioned drawbacks of the conventional fluororesins can be overcome. However, only a few kinds of fluororesins are available to which the surface modification by this technique can be successfully applied and, moreover, the technique has the disadvantage that the expression of adhesion cannot be uniformly obtained over a spectrum of fluororesins each having its own useful performance characteristics. Furthermore, the range of said F/C ratio and of said O/C ratio is very limited so that an elaborate, delicate control technology is essential for converging the surface of any fluororesin into said narrow ranges of atomic ratios, with the result that the production is inevitably complicated.

Thus, because of the lack of sufficient adhesion of the prior art surface-modified fluororesins, fuel hoses manufactured using them are not possessed of the initial bond strength or green bond strength necessary for service. Moreover, the fuel hoses manufactured by the conventional production technologies are not free from problems in the aspects of work safety, production efficiency and cost. However, since the fuel hose having a fluororesin inner ply has a high performance quality and a long life as mentioned above, there is an ardent demand for a solution to the above-mentioned problems.

OBJECT OF THE INVENTION

This invention has for its object to provide a fuel hose having a sufficiently high initial bond strength of not less than 1.2 N/mm between the fluororesin inner ply and the thermoplastic resin or other ply, which is easy to manufacture and free from problems in work safety and cost, a method for production of the hose, and a vacuum plasma apparatus for use in the method.

DISCLOSURE OF THE INVENTION

Having been developed to accomplish the above object, this invention is directed, in a first aspect, to a fuel hose having a laminated structure comprising a tubular or hollow fluororesin inner ply and, as laminated onto the peripheral surface thereof, a thermoplastic resin or rubber outer ply, said tubular fluororesin inner ply having been molded from a fluororesin having an F/C ratio, i.e. a ratio of the number of fluorine atoms (F) to the number of carbon atoms (C), of $\leqq 1.6$ and said outer ply overlying said tubular fluororesin inner ply having been treated to present the following layer (A).

(A) a layer having a distribution of oxygen atoms, an F/C ratio, i.e. ratio of the number of fluorine atoms (F) to the number of carbon atoms (C), of $\leqq 1.12$ and an O/C ratio, i.e. ratio of the number of said oxygen atoms (O) to the number of carbon atoms (C), of $\geqq 0.08$.

This invention is further directed, in a second aspect, to a fuel hose comprising a tubular or hollow fluororesin inner ply and, as laminated onto the peripheral surface thereof, a thermoplastic resin or rubber outer ply, said tubular fluororesin inner ply having been molded from a fluororesin with an F/C ratio, i.e. a ratio of the number of fluorine atoms (F) to the number of carbon atoms (C), of $2.0>(F/C)>1.6$ and said outer ply overlying said tubular fluororesin inner ply having been treated to present the following treated layer (B).

(B) a layer having a distribution of oxygen atoms, with its F/C ratio, i.e. ratio of the number of fluorine atoms (F) to the number of carbon atoms (C), and O/C ratio, i.e. ratio of the number of oxygen atoms (O) to the number of carbon atoms (C), being within the range combining the following two ranges (a) and (b).

(a) The ratio of the number of fluorine atoms (F) to the number of carbon atoms (C) is less than F/C=0.8 and the ratio of the number of oxygen atoms (O) to the number of carbon atoms (C) is not less than O/C=0.08.

(b) The ratio of the number of fluorine atoms (F) to the number of carbon atoms (C) is within the range of F/C=0.8–1.8 and the O/C ratio of the number of oxygen atoms (O) to the number of carbon atoms (C) is within the range defined by the following relation.

$$O/C>0.2-0.09\times(F/C) \quad (1)$$

[In the above relation (1), F/C=0.8–1.8]

This invention is further directed, in a third aspect, to a method for producing a fuel hose having a laminated structure consisting of a tubular fluororesin inner ply and, as disposed on the peripheral surface thereof, a thermoplastic resin or rubber outer ply, which comprises a step of extrusion-molding a tubular fluororesin inner ply, a step of subjecting the peripheral surface of said tubular fluororesin inner ply to plasma treatment under reduced pressure to form a treated layer, and a step of extrusion-molding a thermoplastic resin or rubber ply on the peripheral surface of said tubular fluororesin inner ply.

This invention is further directed, in a fourth aspect, to a vacuum plasma apparatus comprising a hermetic chamber, an electrode means for generating a plasma in said hermetic chamber, and a decompression means for establishing a reduced pressure in said hermetic chamber, said hermetic chamber being equipped with an inlet and an outlet each adapted to accept a hose and each of said inlet and outlet being formed of an elastomeric rubber seal element having a through-hole smaller in inner diameter than the outer diameter of the hose.

Thus, the inventors of this invention did a series of studies for improving the adhesion of fluororesin to other structural materials. Exploring into the mechanism of expression of adhesiveness of fluororesin as part of their research, the inventors discovered that the relative proportions of oxygen atoms and fluorine atoms in the surface layer of fluororesin have significant implications for the expression of adhesion of the resin. They accordingly scrutinized the relative proportions of oxygen and fluorine atoms and discovered that when the ratio (O/C) of the number of oxygen atoms (O) to the number of carbon atoms (C) and the ratio (F/C) of the number of fluorine atoms (F) to the number of carbon atoms (C) are controlled within the above-mentioned ranges, a fluororesin and a thermoplastic resin or the like can be firmly bonded with an initial bond strength of not less than 1.2 N/mm. They further discovered that the availability ratios of fluorine and oxygen atoms (F/C ratio, O/C ratio) can be set within the above-specified ranges by means of vacuum plasma treatment without resort to any extraordinary apparatus or equipment. It was also discovered that when the vacuum plasma apparatus equipped with said elastomeric rubber seals is used for vacuum plasma treatment, a stable plasma can be easily generated. This and said other findings taken together, the inventors succeeded in the development of this invention. This invention makes it possible to provide a high performance fuel hose easily and at low cost.

It should be understood that, as mentioned in this specification, the number of carbon atoms (C), the number of fluorine atoms (F), and the number of oxygen atoms (O), are the values determined by photoelectron spectrometric analysis (ESCA).

This invention is now described in detail.

The fuel hose of this invention comprises a tubular fluororesin inner ply consisting in a specified fluorine-containing resin and, as disposed on the peripheral surface of said tubular inner ply, a thermoplastic or rubber outer ply.

In this invention, said tubular fluororesin inner ply constituting the inner wall member of the hose is whichever of the following two alternative plies, viz. tubular fluororesin inner ply (X) and tubular fluororesin inner ply (Y).

The tubular fluororesin inner ply (X) comprises a fluororesin with an F/C ratio, i.e. ratio of the number of fluorine atoms (F) to the number of carbon atoms (C), of not greater than 1.6 and a peripheral outer ply disposed on the following treated layer (A).

(A) a layer having a distribution of oxygen atoms, with its F/C ratio, i.e. ratio of the number of fluorine atoms (F) to the number of carbon atoms (C), being not greater than 1.12 and O/C ratio, i.e. a ratio of the number of said oxygen atoms (O) to the number of carbon atoms (C), being not less than 0.08.

The fluororesin with an F/C ratio of not greater than 1.6 includes ethylene-tetrafluoroethylene copolymer (ETFE), polyvinylidene fluoride (PVDF), polychlorotrifluoroethylene (CTFE), ethylene-chlorotrifluoroethylene copolymer (ECTFE), vinylidene fluoridetetrafluoroethylene copolymer, vinylidene fluoridetetrafluoroethylene-hexafluoropropylene terpolymer, and vinylidene fluoride-hexafluoropropylene copolymer, among other polymers. These polymers can be used singly or in combination. Preferred in view of high impermeability to gasoline are CTFE and ETFE, and ETFE is most useful.

For improved physical properties, among other purposes, a variety of fillers can be incorporated in the above fluororesin. Among such fillers can be mentioned titanium dioxide, barium sulfate, calcium carbonate, silica, carbon black, magnesium silicate, aluminum silicate, zinc oxide, alumina, calcium sulfate, aluminum sulfate, calcium hydroxide, aluminum hydroxide, talc, molybdenum dioxide, whiskers, short staple fibers, graphite, finely divided metal particles, and so on. The formulating amount of such fillers is not greater than 30 parts by weight (hereinafter referred to briefly as parts) relative to 100 parts of the fluororesin.

The fluororesin constituting said tubular fluororesin inner ply is preferably made electrically conductive for dissipating the static charge which is generated as the fuel (gasoline or the like) flows down the hose. This impartment of electrical conductivity to fluororesin can be accomplished by, for example, incorporating an electrically conductive additive in the fluororesin matrix. The electrically conductive additive may for example be carbon black, finely divided stainless steel filaments or the like. The proportion of such electrically conductive additives is preferably 0.5–30 parts based on 100 parts of fluororesin. When the electrically conductive additive is added within the above range, the volume resistivity of the tubular fluororesin inner ply of the product fuel hose is not greater than $10^{10}$ Ω.cm, with the result that the generated static electricity can be discharged from the hose. As a consequence, hazards such as ignition of the fuel by the accumulated static charge can be precluded.

As can alternative to the use of said tubular fluororesin inner ply (single ply) molded from such a fluororesin containing said filler and electrically conductive additive, it is also possible to use a multiple-layer tubular inner ply which can be provided by laminating a fluororesin containing said filler and additive with a plain fluororesin. The innermost layer of such a multiple-layer tubular fluororesin inner ply, which comes into direct contact with the fuel in service, is usually molded from the fluororesin containing said electrically conductive additive but this invention is not limited to the particular structure. Thus, the generated static charge can be discharged from the hose even when the innermost layer is a fluororesin layer not containing the electrically conductive additive, with the fluororesin containing the additive being disposed immediately on the peripheral surface of said innermost layer, only if the thickness of said innermost layer is sufficiently thin.

Now, using such a fluororesin with an F/C ratio of not greater than 1.6, a tubular inner ply is molded typically by extrusion molding. Then, the peripheral surface layer of this tubular fluororesin inner ply is subjected to a vacuum plasma treatment, which is described hereinafter, so as to form said treated layer (A). This treated layer (A) has an F/C ratio of not greater than 1.12, preferably F/C 0.1–1, and an O/C ratio of not less than 0.08, preferably O/C 0.1–0.5. This is because if the F/C ratio exceeds 1.12 and/or the O/C ratio is less than 0.08, the expression of adhesion will not be sufficient. Moreover, when the F/C ratio and O/C ratio are respectively controlled within the above-mentioned preferred ranges, expression of very high adhesion can be expected.

The tubular fluororesin inner ply (Y) mentioned above is made of a fluororesin with an F/C ratio, i.e. ratio of the number of fluorine atoms (F) to the number of carbon atoms (C), within the range of over 1.6 but not exceeding 2.0 and having a peripheral surface layer processed into the following treated layer (B).

(B) a layer with a distribution of oxygen atoms, with its F/C ratio, i.e. ratio of the number of fluorine atoms (F) to the number of carbon atoms (C), and O/C ratio, i.e. ratio of the number of oxygen atoms (O) to the number of carbon atoms (C), being within the combination of the following ranges (a) and (b).

(a) The ratio of the number of fluorine atoms (F) to the number of carbon atoms (C) is less than F/C=0.8 and the ratio of the number of oxygen atoms (O) to the number of carbon atoms (C) is not less than O/C=0.08.

(b) the F/C ratio of the number of fluorine atoms (F) to the number of carbon atoms (C) is within the range of F/C 0.8–1.8 and the O/C ratio of the number of oxygen atoms (O) to the number of carbon atoms (C) is within the range defined by the following relation:

$$O/C > 0.2 - 0.09 \times (F/C) \quad (1)$$

[In the above relation (1), F/C=0.8–1.8]

The fluororesin having an F/C ratio greater than 1.6 but not exceeding 2.0 includes polytetrafluoroethylene (PTFE), tetrafluoroethylene-hexafluoropropylene copolymer (FEP), tetrafluoroethylene-perfluoroalkyl vinyl ether copolymer (PFA), tetrafluoroethylene-hexafluoropropylene-perfluoroalkoxyethylene terpolymer, vinylidine fluoride-tetrafluoroethylene copolymer, vinylidene fluoride-hexafluoropropylene copolymer, and vinylidene fluoride-tetrafluoroethylene-hexafluoropropylene terpolymer, among others. These polymers can be used singly or in combination. Among them, because of their excellent impermeability to gasoline, FEP and vinylidene fluoride-tetrafluoroethylene-hexafluoropropylene terpolymer are preferred, and vinylidene fluoride-tetrafluoroethylene-hexafluoropropylene terpolymer is most useful.

To the above fluororesin, too, the filler and electrically conductive additive mentioned hereinbefore can be added for improved physical properties and other purposes. The formulating amount of such filler and electrically conductive additive and the mode of use of such a fluororesin containing the filler and electrically conductive additive may also be the same as those described hereinbefore.

Using a fluororesin with an F/C ratio greater than 1.6 but not exceeding 2.0, a tubular inner ply is molded by, for example, extrusion molding. Then, the peripheral surface layer of this tubular fluororesin inner ply is subjected to vacuum plasma treatment, for example under the conditions described hereinafter, to form the above-mentioned treated layer (B). This treated layer (B) is such that its F/C ratio and O/C ratio are within the combination of the above two ranges (a) and (b). Provided that this combination range is adhered to, a treated layer with good expression of adhesion can be obtained. The ranges of F/C ratio and O/C ratio are now described in further detail. The above-mentioned range (a) is such that the F/C ratio is less than 0.8, preferably F/C 0.1–0.5, while the O/C ratio is not less than 0.08, preferably O/C 0.1–0.5. The above-mentioned range (b) is such that the F/C ratio is within the rang of F/C 0.8–1.8, preferably F/C 0.8–1.5, while the O/C ratio is within the range defined by the above-mentioned relation (1), preferably within the range of O/C 0.1–0.5. In the above relation (1), the range of 0.8–1.8 is substituted for the F/C ratio. If the above F/C ratio and O/C ratio are outside the above-mentioned upper and lower limits, the expression of adhesion of fluororesin will be insufficient. When the F/C ratio and O/C ratio are controlled within the above preferred ranges, the adhesion of the resin is remarkably improved. The combination of said ranges (a) and (b) for the tubular fluororesin inner ply (Y) means the total range covered by said ranges (a) and (b).

The thermoplastic resin or rubber ply mentioned above is provided for imparting structural strength to the hose.

There is no particular limitation on the molding material that can be used for said thermoplastic resin ply, thus including various resins such as polyamide resin, polyester resin, urethane resin, etc. and modified resins such as those obtainable by modification of the above-mentioned resins. Among them, polyamide resin is preferred for its excellent dynamic characteristics such as wear and abrasion resistance. The polyamide resin mentioned above includes nylon 6, nylon 66, nylon 11 and nylon 12, among others, and these species of resin can be used singly or in combination. The preferred are nylon 11 and nylon 12 which are outstanding in abrasion resistance and moldability.

For improved processability and flexibility, a plasticizer may be added to said polyamide resin where necessary. The plasticizer that can be used includes sulfonamides and hydroxybenzoic esters. The formulating amount of such plasticizers is generally not greater than 20 parts relative to 100 parts of polyamide resin.

The rubber mentioned as another molding material for the fuel hose of this invention is not particularly critical in kind, either, thus including epichlorohydrin rubber (CO), epichlorohydrin-ethylene oxide equimolar copolymer (ECO, alias CHC), acrylonitrile butadiene rubber (NBR)-polyvinyl chloride (PVC) blend rubber (NBR/PVC), chloroprene rubber (CR), chlorosulfonated polyethylene (CSM), chlorinated polyethylene (CPE), and ethylene-propylene-diene rubber (EPDM), among other rubbers. Among them, ECO, NBR/PVC and CSM are preferred for their high heat resistance and high ozone resistance.

The fuel hose of this invention can be manufactured from the above materials by molding a tubular fluororesin inner ply, subjecting the peripheral surface layer of said tubular fluororesin inner ply to vacuum plasma treatment to form a treated layer and depositing a thermoplastic resin or rubber layer on top of said treated layer. A typical process for fabricating this fuel hose is now described.

Illustrated in FIG. 2 is a vacuum plasma apparatus 30 that can be used in the method of this invention. Using this apparatus 30, the fuel hose of this invention can be fabricated typically by the following procedure.

First, a mandrel 11 is supplied from a mandrel feeder 10 to an inner ply extruder 20 at a speed of 3–20 m/min. Then, the extruder 20 extrudes said fluororesin onto the mandrel 11 to provide a tubular fluororesin inner ply 21. This tubular fluororesin inner ply is generally adjusted to the geometrical range of about 4–50 mm in inside diameter and about 0.05–1 mm in thickness.

Now, the mandrel 11 carrying said tubular inner ply 21 travels through a seal element 13 to a reaction chamber 32 of the vacuum plasma apparatus 30. For establishing a stable plasma, the air in the reaction chamber 32 is evacuated by a decompression means (vacuum pump) 34 and, then, supplied with an electrical discharge gas from a gas supply means 35. The reaction chamber 32 is maintained at a vacuum or reduced pressure of 0.005–8 Torr. As the above-mentioned electrical discharge gas, it is preferable to employ Ar gas alone but a mixed gas of Ar and $N_2$, or $N_2$ gas alone can likewise be employed. Electrodes 32a define, between them, a plasma treatment zone into which the mandrel 1 carrying said tubular fluororesin inner ply 21 is guided and the peripheral surface layer of the ply 21 is subjected to plasma treatment. In this plasma treatment, an impedance-matched high-frequency, high-output current is applied to the electrodes 32a for a predetermined time from a high-frequency power source 40 and a matching box 41 to induce an electrical discharge between said electrodes and thereby ionize said electrical discharge gas to form a plasma. The frequency used is in the range of 0.1–1000 MHz, preferably 1–100 MHz. The output of said high frequency power source is in the range of 2–300 W, preferably 5–200 W. The treatment time is dependent on the type and size of the fluororesin material but is generally 2–180 seconds and preferably 5–60 seconds. By this vacuum plasma treatment, the peripheral surface layer of the tubular fluororesin inner ply is modified into said treated layer (A) or (B). The conditions of plasma treatment for the formation of said treated layer (A) or (B) are selected according to the type of fluororesin used, among other factors. The vacuum plasma treatment for the formation of treated layer (A) or (B) is preferably a glow discharge plasma treatment using an Ar gas-containing atmosphere. By this glow discharge plasma treatment, said treated layer (A) or (B) can be easily formed. Since this glow discharge plasma treatment does not require a high degree of vacuum, there is the advantage that the vacuum plasma apparatus need not be an elaborate, high performance equipment but be an ordinary one. The Ar-containing gas mentioned above includes Ar gas alone, and a mixture of Ar gas and $N_2$, $H_2$ or $O_2$ gas, for instance. The proportion of Ar gas in such a mixture gas is preferably not less than 50 volume % based on the total gas. After the above plasma treatment, the mandrel 11 further travels through the seal 13 and is withdrawn from the vacuum plasma apparatus 30. Immediately thereafter, a sheath ply extruder 50 extrudes a thermoplastic resin or rubber onto the peripheral surface of said tubular inner ply 21 to form a sheath or outer ply 51. When this ply 51 is formed using a thermoplastic resin, the thermal fusion technique mentioned hereinbefore can be employed. Thus, since the thermoplastic resin for extrusion molding is generally in hot molten state, this melt can be directly extruded onto the peripheral surface of said tubular inner ply 21 and, then, chilled to solidify, whereby an outer ply 51 of thermoplastic resin is firmly bonded to the peripheral surface of the tubular fluororesin inner ply 21. By this thermal fusion technique, the step of applying an adhesive can be dispensed with so that the efficiency of production of a fuel hose is enhanced. When a rubber ply is to be formed, the extrusion step must be followed by a vulcanizing step. The conditions of this vulcanization can be selected according to the kind of rubber used but is generally 150°–180° C.×20–90 minutes. The thickness of said outer ply 51 is generally in the range of about 0.2–4 mm and preferably about 0.5–3 mm. The mandrel 11 carrying the tubular inner ply 21 and outer ply 51 is taken up by a mandrel takeup device 60. The fuel hose of this invention can be manufactured by the above-described continuous series of steps.

The method for manufacturing the fuel hose of this invention has been described above, taking the procedure employing a mandrel as an example, but the fuel hose can also be manufactured without enlisting the help of a mandrel. Thus, the use of a mandrel for the production of a hose is intended to retain the shape of a hose throughout the process, and particularly since the tubular fluororesin inner ply 21 of the fuel hose of this invention is as thin as 0.05–1.00 mm, the tubular ply tends to collapse in the absence of a mandrel, thus failing to retain its hollow structure. If the tubular fluororesin inner ply 21 collapses in this manner, a thermoplastic resin or other ply may hardly be formed on the peripheral surface of the inner ply. However, since the production technology for a fuel hose in accordance with this invention is a vacuum plasma process, no such troubles are encountered even in the absence of a mandrel. Thus, whereas the internal plenum of the tubular fluororesin inner ply 21 is atmospheric air, the reaction chamber of the vacuum plasma apparatus 30 is maintained under a reduced pressure of 0.005–8 Torr as mentioned above, with the result that as said tubular inner ply 21 is guided into the vacuum plasma apparatus 30, the very pressure differential helps retain the shape of the hose in the absence of a mandrel. Therefore, in the above description of the apparatus and method for fabricating a fuel hose (FIG. 2), the mandrel feeder 11 can be dispensed with and the tubular fluororesin inner ply 21 emerging from the inner ply extruder 20 can be immediately guided into the vacuum plasma apparatus 30. Then, the same procedure as described above can be followed. In this manner, the fuel hose can be manufactured without employing a mandrel. When the use of a mandrel is dispensed with in this manner, the operation for slipping out the mandrel is no longer required and, therefore, the efficiency of production of the fuel hose is further enhanced.

In the above description of the procedure for fabricating a fuel hose, the three production stages of tubular inner ply molding, vacuum plasma treatment, and formation of a thermoplastic resin or other ply on the peripheral surface of the inner ply are continuously carried out but this mode of operation is not an exclusive choice. A typical alternative procedure comprises taking up the tubular fluororesin inner ply 21 immediately as it emerges from the inner ply extruder 20 on a takeup device (not shown), paying out the tubular inner ply 21 from the takeup device to the vacuum plasma apparatus, and molding a thermoplastic resin or other layer on the plasma-treated peripheral surface of said inner ply. The rationale is that whereas the first-mentioned continuous process is preferred for the manufacture of a long hose, the latter process which is a partial bath process may prove more efficient for the manufacture of a short fuel hose. Moreover, in this partial batch process, the material for the tubular inner ply and/or that for the thermoplastic resin or rubber outer ply can be easily changed for each production lot.

The method for producing a fuel hose has been described above by taking the fabrication of a double-ply fuel hose as an example but this invention is not limited to such a structure. Thus, while the basic structure of the fuel hose of this invention is a double-ply hose consisting of a tubular fluororesin inner ply 21 and a peripheral thermoplastic resin or rubber ply 51, a three-ply, four-ply or other multiple-ply fuel hose can also be manufactured in accordance with this invention by superimposing a reinforcing cord ply, a sheath ply, and/or other ply on top of said outer ply 51.

A typical three-ply fuel hose comprises, as illustrated in FIG. 8, said tubular fluororesin inner ply 21, said outer ply 51 disposed on the treated layer 21a of said inner ply, and a rubber or elastomer sheath ply 61 disposed on the peripheral surface of said outer ply 51. The rubber sheath ply 61 may be molded from any of CSM, CR, NBR/PVC, ECO, EPR, etc. mentioned hereinbefore. The elastomer sheath ply 61 may be molded from a thermoplastic elastomer such as urethane, olefinic, nitrile and amide elastomers. The thickness of such rubber or elastomer sheath layer 61 is generally about 0.5–5.0 mm and preferably about 0.5–3.0 mm. The fuel hose equipped with the sheath ply 61 has flame resistance and chipping resistance in addition to the gasoline impermeability, corrosion resistance and other characteristics of the two-ply hose described above.

A typical four-ply fuel hose is illustrated in FIG. 9, which shows a fuel hose consisting of a tubular fluororesin inner ply 21, an outer ply 51 formed on the treated layer 21a of said inner ply 21, a reinforcing cord ply 71 disposed on the peripheral surface of said outer ply 51, and said rubber or elastomer sheath ply 61 disposed on the peripheral surface of said ply 71. The reinforcing cord ply 71 is a knitted or interplaced ply of natural fiber such as linen, cotton, etc., of a synthetic yarn such as polyester yarn, vinylon yarn, etc. or of metal filaments or wires. With the provision of said reinforcing cord ply 71, the pressure resistance of the fuel hose is increased. The thickness and material of said sheath layer 61 of this 4-ply fuel hose can be the same as those of the sheath layer 61 of said 3-ply fuel hose.

When the reinforcing cord ply 71 and sheath ply 61 described above are provided, a knitting or interlacing device and an extruder are disposed downstreams of said outer ply extruder 50 shown in FIG. 2, so that a multiple-ply fuel hose having said reinforcing cord ply and sheath ply can be manufactured through knitting/interlacing and extrusion steps.

In the manufacture of the fuel hose according to this invention, after said vacuum plasma treatment of the peripheral surface layer of the tubular fluororesin inner ply to form said treated layer, an adhesive may be applied, as in the prior art process for producing a fuel hose, to said treated layer and, then, a thermoplastic resin or rubber ply may be superimposed. In this case, an adhesive applicator (not shown) is disposed between the vacuum plasma apparatus 30 and the outer ply extruder 50 shown in FIG. 2 so that application of the adhesive can be integrated into a continuous production flow. With the aid of such an adhesive layer, the bond strength of the fuel hose can be further increased. The effect of this increased bond strength is particularly remarkable when said rubber ply is employed.

It is preferable that, as illustrated in FIG. 3, the tubular fluororesin inner ply 21 be caused to traverse a cooling zone 15 before it is guided through the vacuum plasma apparatus 30. This is because the tubular fluororesin inner ply just extruded is still hot and soft so that it has poor shape retentivity. Incidentally, in FIG. 2 and FIG. 3, the like parts are indicated by the like numerals.

The vacuum plasma apparatus for use in this invention is now described.

While the production of a fuel hose was described above referring to a vacuum plasma apparatus equipped with internal electrodes (FIG. 2), the vacuum plasma equipment that can be used is not limited to that particular apparatus. Thus, aside from the equipment having internal electrodes, a vacuum plasma equipment equipped with an induction coil electrode means 32b on the periphery of the equipment body 30 as illustrated in FIG. 4 can be employed. In FIG. 4, too, the like numerals are used to designate the like parts of FIG. 2.

As mentioned hereinbefore, the plasma treatment according to this invention is carried out at a subatmospheric or negative pressure. If the sealing effect of the seal 13 of the vacuum plasma apparatus 30 is poor, it is difficult to control the degree of vacuum within the apparatus at a constant level so that a stable plasma cannot be generated. This has serious implications particularly in the continuous production of a long hose. As mentioned hereinbefore, when the conventional vacuum plasma equipment is employed, it is necessary to use a batch method or provide a series of vacuum zones utilizing a differential evacuation system at the hose inlet and outlet of the equipment. Using the former method, viz. a batch method, results in a considerable decrease in production efficiency. In the case of the latter system, special devices (vacuum zones) must be provided in the vacuum plasma equipment so that an additional capital expenditure is required. Therefore, in this invention, the seals 13 of the vacuum plasma apparatus are formed of a rubber-like elastomer to keep the vacuum plasma apparatus air-tight, whereby the above-mentioned problems of decreased production efficiency and increased cost are obviated. The rubber-like elastomer mentioned above is preferably one with a hardness of 45–80 (JIS A). The type of rubber-like elastomer is not particularly critical but good results are obtained when silicone rubber or NBR is employed. Thus, the seals 13 formed of such a suitable type of rubber-like elastomer having an appropriate hardness are highly capable of yielding in intimate contact with the hose (tubular fluororesin inner ply 21) introduced into the vacuum plasma apparatus 30 and withdrawn from the apparatus at a given speed so that even when the introduction and withdrawal speed of said hose is increased to a fairly high level (about 5–20 m/min.), the air-tightness of the vacuum plasma chamber can be sufficiently maintained. By increasing the introduction and withdrawal speed of the hose in this manner, the production efficiency of the fuel hose can be enhanced. The rubber-like elastomer seal may be configured typically as illustrated in FIG. 6, namely seal 13a, or as illustrated in FIG. 7, namely seal 13b. In both diagrams, the tubular fluororesin inner ply is indicated by the reference numeral 21. Referring to FIG. 6, when the rubber-like elastomer (seal 13a) is configured in a generally frustoconical profile like that of a cup, the area of contact with the hose (tubular fluororesin inner ply) is reduced to lower the contact frictional force so that the hose can be smoothly introduced and withdrawn and, at the same time, the equipment can be kept sufficiently air-tight. In FIG. 6, the arrowmark indicates the direction of advance of the hose. As an alternative, the rubber-like elastomer (seal 13b) may be disk-shaped as illustrated in FIG. 7. When the seal is such a rubber-like elastomer disk, the air-tightness of the vacuum plasma apparatus 30 is further increased. As an alternative, each of said seals may take the form of a seal chamber as illustrated in FIG. 14. The seal chamber comprises a disk-shaped rubber-like elastomer seal element 13b disposed at either end of a cylindrical housing 81. To the barrel of said housing 81 is connected a pipe 17a through which the seal chamber communicates with a vacuum pump (not shown). In the diagram, the tubular fluororesin inner ply is indicated at 21. By means of said vacuum pump, this seal chamber is decompressed to approximately the same degree of vacuum as the auxiliary vacuum chamber to be described hereinafter. When the seal is in the form of a seal chamber, the air-tightness of the vacuum plasma apparatus is further improved. Similarly satisfactory results can also be obtained when the seal member 13a shown in FIG. 6 is formed at either end of said cylindrical housing 81.

As still another mode of seal, auxiliary vacuum chambers 31 each having two serial seals may be provided as shown in FIG. 5. Each auxiliary vacuum chamber 31 is an air-tight compartment isolated from the reaction chamber 32 by a divider 16, and this auxiliary vacuum chamber 31 communicates with a vacuum pump 36 via a line 17. In the diagram, the reference numeral 18 indicates a valve installed partway in said line 17. The seal means 13 of this auxiliary vacuum chamber through which the hose (tubular fluororesin inner ply 21) goes in and out can be similar to said rubber-like elastomer seal elements. The geometry of such a rubber-like elastomer seal element is not particularly restricted but may for example take any of the two configurations 13a and 13b described above or the form of said seal chamber, among others, but the disk-shaped rubber-like elastomer seal 13b (FIG. 7) is preferred. In FIG. 5, the like numerals are used to designate the like parts of FIG. 2.

The introduction and withdrawal of the tubular fluororesin inner ply 21 with respect to the vacuum plasma apparatus 30 via said auxiliary vacuum chambers 31 are carried out as follows. For introduction, in the first place, the tubular fluororesin inner ply 21 is passed from one side of a first auxiliary vacuum chamber 31 through its seal 13 into the auxiliary vacuum chamber 31 and, then, passed through the seal 13 at the other end of the chamber 31 into the vacuum plasma apparatus 30. Withdrawal of the tubular fluororesin inner ply 21 is performed in the reverse order. When the tubular fluororesin inner ply 21 traverses the auxiliary vacuum chamber 31, the internal pressure within the auxiliary vacuum chamber has been set under moderate reduced pressure (about 0.1–10 Torr), by the vacuum pump 36 via line 17, as compared with the reaction chamber 32. With this provision of the auxiliary vacuum chambers 31, the entry of external air from the hose inlet and outlet into the vacuum plasma apparatus 30 can be completely prevented. As a result, the degree of vacuum within the reaction chamber 32 can be exactly controlled so as to insure generation of a stable plasma.

By the vacuum plasma treatment under the above specified conditions, the peripheral surface layer of the tubular fluororesin inner ply can be modified into a treated layer (A) or (B) having both the F/C ratio and O/C ratio within the specified ranges. The F/C and O/C ratios are the values determined by ESCA as mentioned hereinbefore. The ESCA is a technique for analyzing the peripheral surface of the plasma-treated tubular fluororesin inner ply using a photoelectron spectrometer (e.g. ES-200, Kokusai Denki). The typical parameter settings of this spectrometric instrument are as follows.

Exciting X-rays: AL, $K\alpha_{1,2}$ line (1486.6 eV)

X-ray output: 10 kV, 20 mA

Temperature: 20° C.

Degree of vacuum: $3\times10^{-8}$ Torr

When, in this manner, a fluororesin having an F/C ratio within the specified range is employed and its surface layer is modified into a treated layer with F/C and O/C ratios within the specified ranges, typically by vacuum plasma treatment, the necessary adhesion to other materials is expressed. Although the mechanism of this expression of adhesion cannot be categorically explained, the inventors of this invention advance the following assumption on the basis of findings obtained in their research into the fuel hose. Thus, when the surface layer of a fluororesin is activated by, for example, vacuum plasma treatment, fluorine and hydrogen atoms are driven off from the molecular skeleton of the fluororesin, leaving carbon radicals. Therefore, in at least some part of the surface layer, a crosslinking reaction takes place between carbon radicals to form a tough surface layer. In the other part of the surface layer, the carbon radicals are bound to oxygen in the air to form functional groups such as carboxyl, aldehyde and ketone groups. The treated layer having such functional groups has a remarkably enhanced affinity for thermoplastic resins such as polyamide resin containing amido linkages within the molecular skeleton or for rubber. It is supposed that the expression of adhesion occurs as a consequence in the surface layer of the fluororesin.

As described above, the fuel hose of this invention comprises a tubular fluororesin inner ply and a thermoplastic resin or rubber ply as disposed on the periphery of said inner ply, said tubular fluororesin inner ply having been molded from a fluororesin having an F/C ratio within the specified range and the peripheral surface layer of said tubular fluororesin inner ply having been modified into a treated layer controlled within the specified ranges of F/C ratio and O/C ratio. Since the fluororesin having a treated layer of such a specified atomic composition is employed, the fuel hose of this invention features a very firm bond, with an initial bond strength value of not less than 1.2 N/mm, between the fluororesin ply and the thermoplastic resin or rubber ply. Therefore, the fuel hose of this invention is free from troubles such as obstruction due to exfoliation of the tubular fluororesin inner ply from said thermoplastic resin ply during the transport of the fuel such as gasoline. Moreover, when a polyamide resin having especially good abrasion resistance and other dynamic characteristics is selectively used for the molding of said outer ply to be laminated onto the peripheral surface of said tubular fluororesin inner ply, the service life of the fuel hose can be prolonged. Moreover, when the thickness of the tubular fluororesin inner ply is reduced to as small as about 0.05–1.00 mm, savings can be realized in fluororesin which is expensive so that the cost of the fuel hose can be lowered. It is also possible to further improve the bond strength of the fuel hose by interposing an adhesive layer between the tubular fluororesin inner ply and the outer ply disposed on the peripheral surface of said inner ply.

The method of this invention for producing a fuel hose comprises forming a tubular fluororesin inner ply by an extrusion or other molding technique, subjecting the peripheral surface layer of said inner ply to vacuum plasma treatment to create a treated layer, and forming a thermoplastic resin or rubber ply on the surface of said treated layer. These respective steps can be respectively carried out in a continuous manner and can also be performed as a whole in a continuous sequence. Therefore, the method of this invention for producing a fuel hose is a method providing for a high production efficiency. Furthermore, in the formation of said thermoplastic resin or other outer ply, the resin or the like can be heated and directly fused to the peripheral surface (treated layer) of the tubular fluororesin inner ply to form said thermoplastic resin or other outer ply.

The vacuum plasma apparatus for use in the method of this invention for the production of a fuel hose incorporates a special sealing contrivance. Thus, in order to retain the necessary negative pressure within the apparatus, the seals of the vacuum plasma apparatus are made of a rubber-like elastomer. Therefore, this vacuum plasma apparatus permits continuous treatment, and unlike the conventional plasma equipment, does not require a special device (a vacuum zone or the like). And yet, even in the production of a hose of great length, the apparatus permits application of a stable plasma treatment to its tubular fluororesin inner ply. When said rubber elastomer seal is made of a rubber-like elastomer with a hardness of 45–80 (JIS A), a greater air-tightness of the apparatus can be insured and, at the same time, the seal may yield well in intimate contact with the tubular fluororesin inner ply so that the inner ply can be introduced and withdrawn at a high speed. Furthermore, when the seal is formed as a seal chamber as illustrated in FIG. 14, the degree of vacuum in the vacuum plasma apparatus can be maintained still more certainly so that a very satisfactory plasma can be generated over a long time.

The following examples and comparative examples are further illustrative of this invention.

EXAMPLES 1–5

Figure 2:
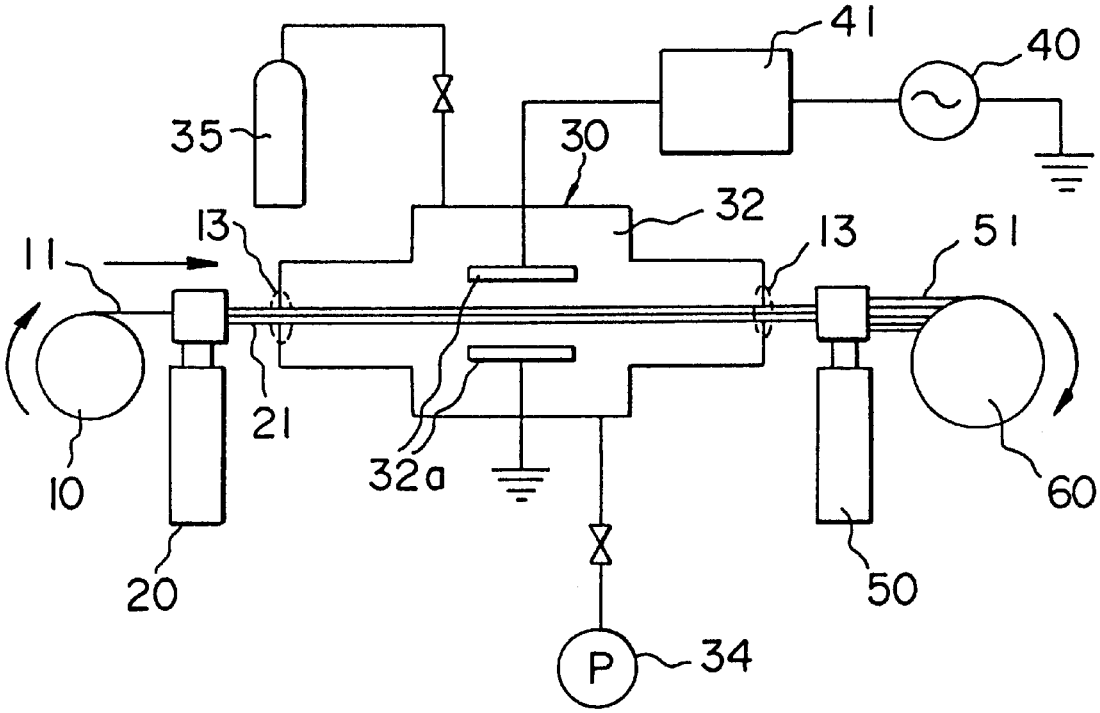
FIG. 2 is a schematic diagram illustrating the method for producing a fuel hose in accordance with this invention.
Figure 3:
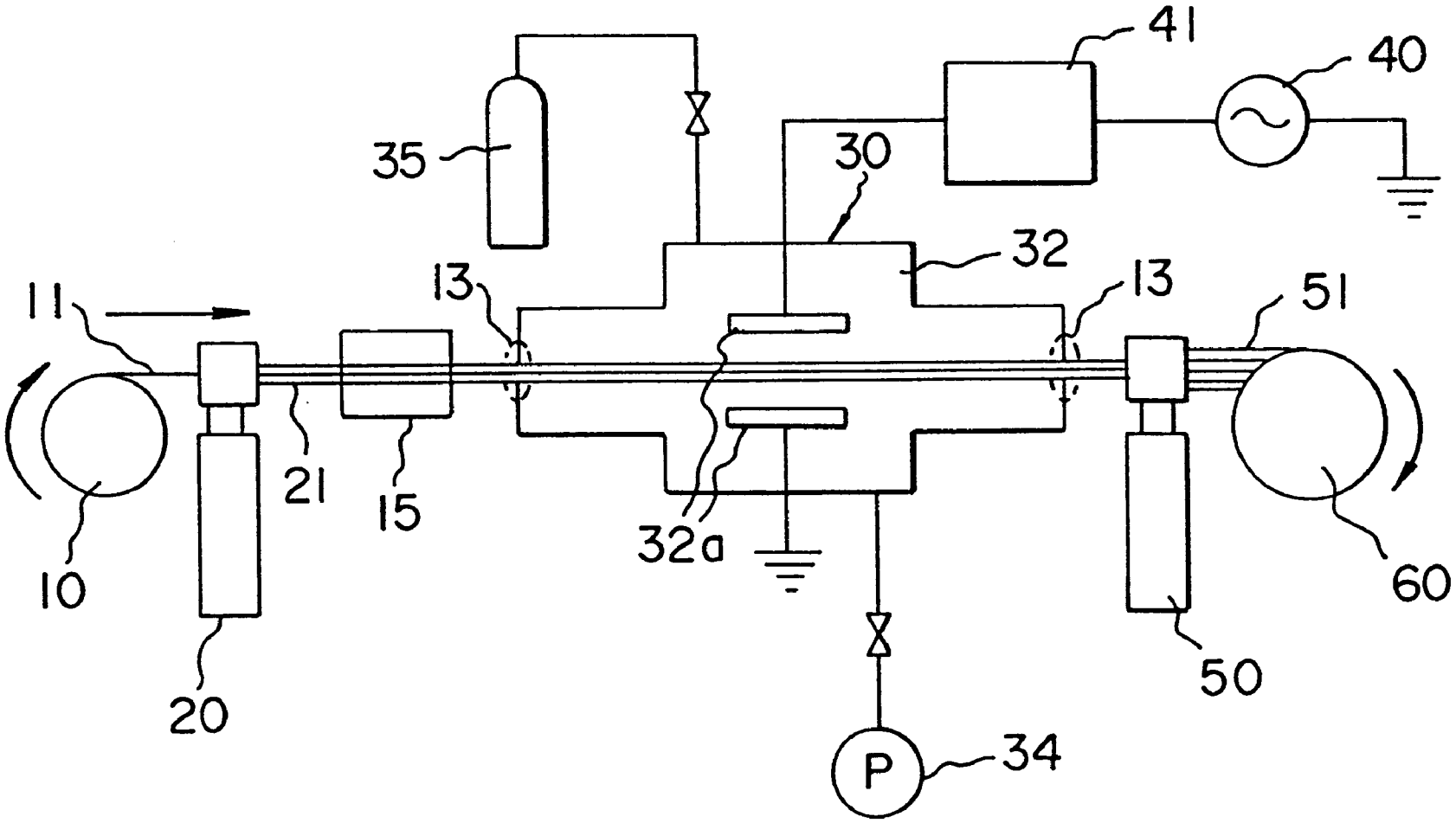
FIG. 3 is a schematic diagram illustrating an embodiment in which a cooling zone is used in the method for producing a fuel hose in accordance with this invention.
Figure 4:
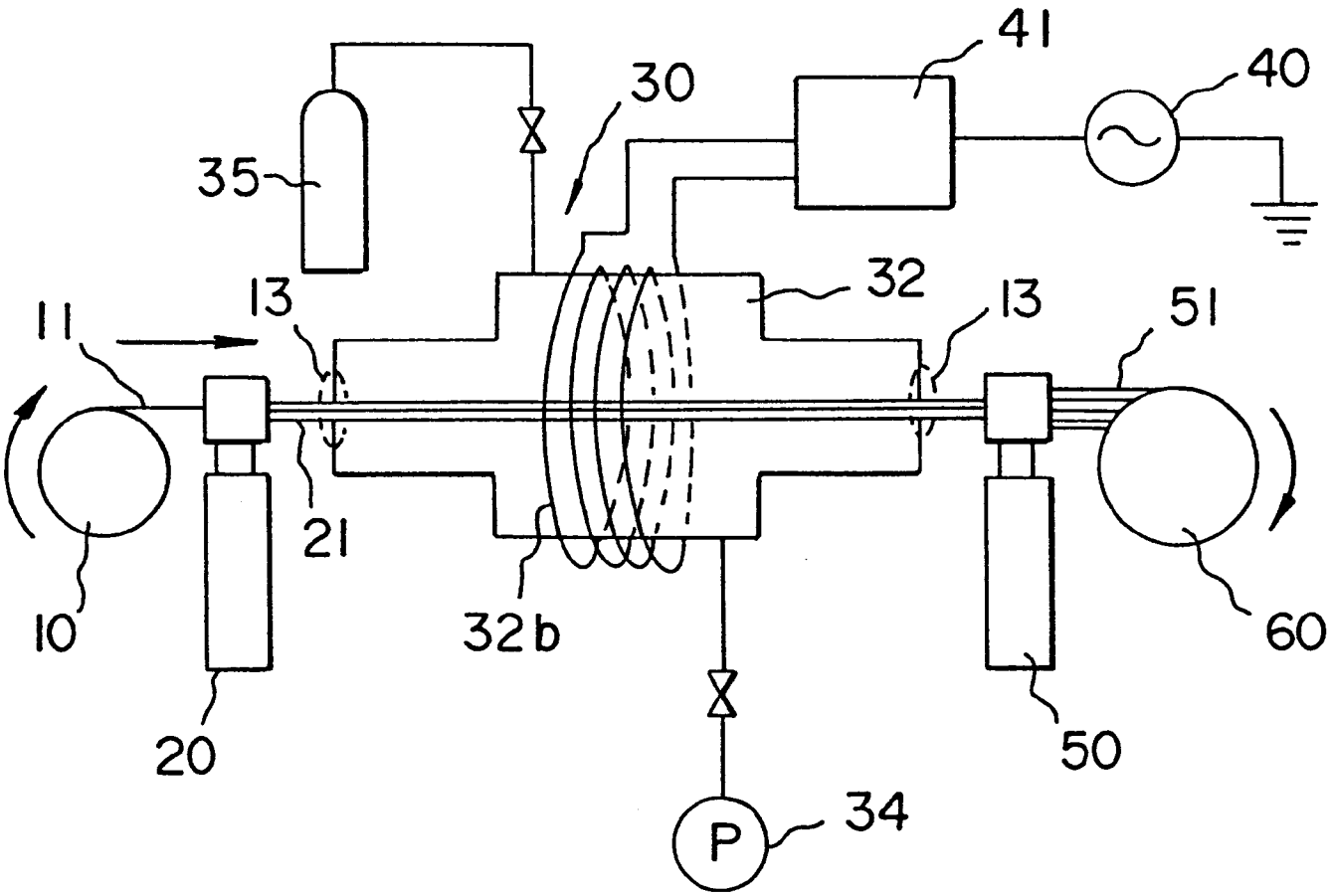
FIG. 4 is a schematic diagram illustrating an embodiment in which a vacuum plasma apparatus equipped with an induction coil electrode means is used in the above method for producing a fuel hose in accordance with this invention.

By means of the vacuum plasma apparatus illustrated in FIG. 2, a fuel hose was fabricated using ETFE as the molding material for a tubular fluororesin inner ply and nylon 12 as the molding material for an outer ply to be formed on the peripheral surface of said inner ply.

First, the mandrel 11 was supplied from the mandrel feeder 10 to the inner ply extruder 20 at a speed of 10 m/min. From this inner ply extruder 20 was extruded the ETEF onto the peripheral surface of the mandrel 11 to form a tubular ETFE inner ply with a geometry of 6.0 mm in inner diameter and 0.25 mm in thickness. This tubular ETFE inner ply 21 was guided into the discharge chamber 32 of the vacuum plasma apparatus 30. After the discharge chamber 32 was decompressed by the vacuum pump 34 to $10^{-3}$ Torr, an electrical discharge gas was supplied from a gas source 35 to establish a predetermined negative pressure within the chamber. The electric discharge gas and degree of vacuum used in each example are shown below in Table 1.

TABLE 1

| Example | Electrical discharge gas | Degree of vacuum (Torr) |
|---|---|---|
| 1 | Ar | 0.1 |
| 2 | Ar | 0.05 |
| 3 | $N_2$ | 0.1 |
| 4 | $N_2$ | 0.05 |
| 5 | Ar + $N_2$ | 0.05 |
| 6 | Ar | 0.05 |

Figure 1:
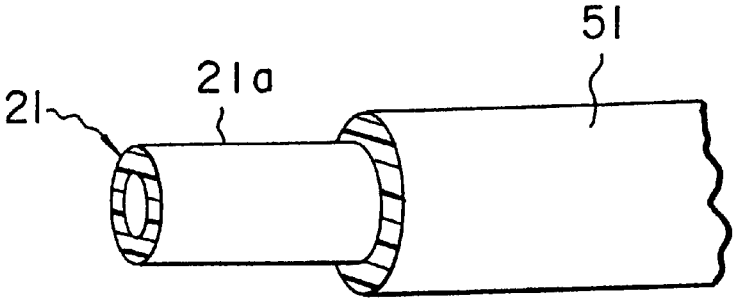
FIG. 1 is an elementary diagram showing the fuel hose of this invention.

Then, the tubular ETFE inner ply 21 was guided into position between the elctrodes 32a within said discharge chamber 32 and using a high frequency power source 40 and a matching box 41, an impedance-matched high frequency current with a frequency of 13.56 MHz and an output of 10 W was applied to the electrodes 32a to generate a plasma by glow discharge, whereby the peripheral surface layer of said tubular ETFE inner ply 21 was plasma-treated to form a treated layer 21a (FIG. 1). After this plasma treatment, the tubular ETFE inner ply 21 was withdrawn from the vacuum plasma apparatus 30 and fed to an outer ply extruder 50. By this outer ply extruder 50, a 0.75 mm thick ply 51 made of nylon 12 was laminated in direct superimposition on said treated layer of the tubular ETFE inner ply 21. The laminates obtained in the above manner were respectively taken up on a mandrel takeup 60 to provide fuel hoses of Examples 1–5. The molding of said ply 51 was performed by extruding nylon 12 from an extruder 50 at a temperature of 240° C.

EXAMPLE 6

Using a vacuum plasma apparatus illustrated in FIG. 2 for plasma treatment, ETFE for the tubular fluororesin inner ply and ECO for the outer ply to be formed on the peripheral surface of said inner ply, a fuel hose was fabricated. In this production process, Ar gas was used as the electrical discharge gas, the degree of vacuum was set at 0.05 Torr, and the thickness of the ECO ply was controlled at 2 mm. After extrusion of the outer ply from the extruder 50, the laminate was taken up on the mandrel takeup 60 and the ECO ply 51 was then vulcanized at 160° C. for 45 minutes. Otherwise the procedure of Examples 1–5 was repeated to provide a fuel hose of Example 6.

Comparative Example 1

A fuel hose was fabricated in the same manner as Example 1 except that the tubular ETFE inner ply 21 was not subjected to vacuum plasma treatment.

Comparative Example 2

A fuel hose was fabricated in the same manner as Example 3 except that the degree of vacuum for plasma treatment was set to 10 Torr.

EXAMPLES 7 and 8

Except that CTFE was used as the molding material for the tubular fluororesin inner ply and the electrical discharge gases and degrees of vacuum shown below in Table 2 were employed, fuel hoses were fabricated in otherwise the same manner as Examples 1–5.

TABLE 2

| Example | Electrical discharge gas | Degree of vacuum (Torr) |
|---|---|---|
| 7 | $N_2$ | 0.1 |
| 8 | $N_2$ | 0.05 |

Comparative Example 3

A fuel hose was fabricated in the same manner as Examples 7 and 8 except that the tubular CTFE inner ply 21 was not subjected to vacuum plasma treatment.

Comparative Example 4

A fuel hose was fabricated in the same manner as Example 7 except that the degree of vacuum for plasma treatment was set to 10 Torr.

EXAMPLES 9–14

Except that FEP was used as the molding material for the tubular fluororesin inner ply and the electrical discharge gases and degrees of vacuum shown below in Table 3 were employed, fuel hoses were fabricated in otherwise the same manner as Examples 1–5.

TABLE 3

| Example | Electrical discharge gas | Degree of vacuum (Torr) |
|---|---|---|
| 9 | Ar | 0.1 |
| 10 | Ar | 0.05 |
| 11 | $N_2$ | 0.3 |
| 12 | $N_2$ | 0.1 |
| 13 | $N_2$ | 0.05 |
| 14 | Ar + $N_2$ | 0.05 |
| 15 | Ar | 0.05 |

Example 15

A fuel hose was fabricated using FEP for the tubular fluororesin inner ply, ECO as the molding material for the outer ply to be laminated on the peripheral surface of said inner ply, and the apparatus of FIG. 2 for vacuum plasma treatment. In this production process, Ar gas was used as the electrical discharge gas and the degree of vacuum was set to 0.05 Torr for vacuum plasma treatment. The thickness of the ECO ply was set to 2 mm. After extrusion of the outer ply from extruder 50, the hose was taken up on the mandrel takeup 60 and the ECO ply was vulcanized at 160° C. for 45 minutes. Otherwise the procedure of Examples 9–14 was repeated to provide a fuel hose.

Comparative Example 5

A fuel hose was fabricated in the same manner as Examples 9–14 except that the tubular FEP inner ply 21 was not subjected to vacuum plasma treatment.

Comparative Example 6

A fuel hose was fabricated in the same manner as Example 11 except that the degree of vacuum for plasma treatment was set to 10 Torr.

Comparative Example 7

A fuel hose was fabricated in the same manner as Example 15 except that the degree of vacuum for plasma treatment was set to 10 Torr.

EXAMPLE 16

A fuel hose was fabricated in the same manner as Example 1 except that the degree of vacuum for plasma treatment was set to 5 Torr.

EXAMPLE 17

A fuel hose was fabricated in the same manner as Example 6 except that the degree of vacuum for plasma treatment was set to 5 Torr.

EXAMPLE 18

A fuel hose was fabricated in the same manner as Example 9 except that the degree of vacuum for plasma treatment was set to 5 Torr.

EXAMPLE 19

A fuel hose was fabricated in the same manner as Example 15 except that the degree of vacuum for plasma treatment was set to 5 Torr.

For each of the above fuel hoses of Examples 1–19 and of Comparative Examples 1–7, the atomic composition of the treated layer of the tubular fluororesin inner ply, the bond strength between the inner ply and the outer ply formed on the peripheral surface thereof, gasoline resistance and thermal aging resistance were determined. The results are shown in Tables 4–9. These characteristics were determined by the following methods.

[Atomic composition of the treated layer of the tubular fluororesin inner ply]

This parameter was determined by ESCA. Thus, using a photoelectron spectrometer (ES-200, Kokusai Denki), ESCA was made under the following conditions.

Exciting X-rays: Al, $K\alpha_{1,2}$ lines (1486.6 eV)

X-ray output: 10 kV, 20 mA,

Temperature: 20° C.

Degree of vacuum: $3\times10^{-8}$ Torr

[Bond strength]

Figure 10:
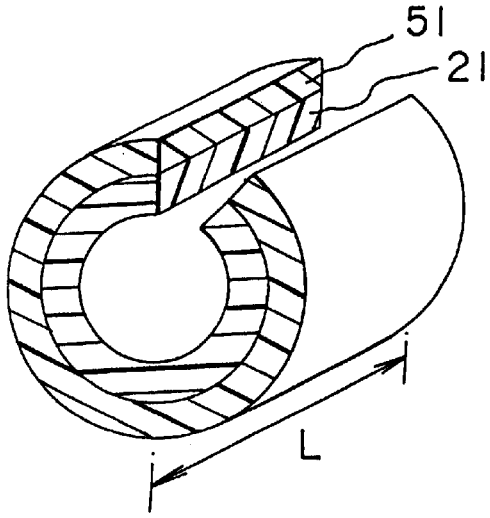
FIG. 10 is an elementary view of a testpiece used for determination of the bond strength of the fuel hose.

The bond strength was determined in accordance with JIS K 6301. Thus, as illustrated in FIG. 10, each fuel hose was sliced into a 10 mm (L) ring which was then cut in the longitudinal direction to prepare a sample. The inner ply 21 and outer ply 51 of this sample were partially peeled off from the section and the peeled ends were secured stationary with the jig of a tensile tester and a tensile test was performed at a peeling speed of 25 mm/min. The load found from this tensile test was regarded as the bond strength between the two plies.

[Gasoline immersion test]

The testpiece for the above determination of bond strength was immersed in gasoline at 40° C. for 168 hours and the bond strength between the tubular fluororesin inner ply and the outer ply laminated onto the periphery of said inner ply was determined in the same manner as described above.

[Thermal aging test]

The testpiece for the above determination of bond strength was heat-treated at 125° C. for 168 hours and, then, the bond strength between the tubular fluororesin inner ply and the outer ply laminated onto the periphery of said inner ply was determined in the same manner.

TABLE 4

| | Example | | | | | |
|---|---|---|---|---|---|---|
| | 1 | 2 | 3 | 4 | 5 | 6 |
| F/C | 0.65 | 0.30 | 0.60 | 0.32 | 0.55 | 0.30 |
| O/C | 0.16 | 0.25 | 0.14 | 0.19 | 0.12 | 0.25 |
| Bond strength (N/mm) | 5.7 | 6.5 | 4.5 | 5.6 | 4.3 | 5.2 |
| Gasoline immersion test (N/mm) | 4.5 | 4.8 | 4.0 | 4.4 | 3.8 | 2.7 |
| Thermal aging test (N/mm) | 5.3 | 6.5 | 4.3 | 5.4 | 4.2 | 5.0 |

TABLE 5

| | Comparative Example | |
|---|---|---|
| | 1 | 2 |
| F/C | 0.98 | 0.80 |
| O/C | 0.01 | 0.06 |
| Bond strength (N/mm) | 0.2 | 0.8 |
| Gasoline immersion test (N/mm) | 0 | 0.3 |
| Thermal aging test (N/mm) | 0 | 0.5 |

TABLE 6

| | Example | | Comparative Example | |
|---|---|---|---|---|
| | 7 | 8 | 3 | 4 |
| F/C | 1.02 | 0.60 | 1.51 | 1.10 |
| O/C | 0.13 | 0.18 | 0 | 0.06 |
| Bond strength (N/mm) | 5.1 | 5.6 | 0.1 | 0.7 |
| Gasoline immersion test (N/mm) | 4.1 | 4.2 | 0 | 0.2 |
| Thermal aging test (N/mm) | 4.8 | 5.4 | 0 | 0.4 |

TABLE 7

| | Example | | | | | | |
|---|---|---|---|---|---|---|---|
| | 9 | 10 | 11 | 12 | 13 | 14 | 15 |
| F/C | 1.48 | 0.76 | 1.70 | 1.08 | 0.58 | 1.40 | 0.76 |
| O/C | 0.17 | 0.26 | 0.07 | 0.12 | 0.23 | 0.13 | 0.26 |
| Bond strength (N/mm) | 5.5 | 6.0 | 4.4 | 4.9 | 5.1 | 4.0 | 5.1 |
| Gasoline immersion test (N/mm) | 4.0 | 4.4 | 3.8 | 3.8 | 4.0 | 3.3 | 2.7 |
| Thermal aging test (N/mm) | 5.3 | 5.9 | 4.2 | 4.5 | 4.8 | 3.4 | 4.7 |

TABLE 8

| | Example | | | |
|---|---|---|---|---|
| | 16 | 17 | 18 | 19 |
| F/C | 0.73 | 0.73 | 0.70 | 0.70 |
| O/C | 0.08 | 0.08 | 0.08 | 0.08 |
| Bond strength (N/mm) | 1.8 | 1.6 | 1.6 | 1.2 |
| Gasoline immersion test (N/mm) | 0.8 | 0.8 | 0.4 | 0.6 |

TABLE 8-continued

| | Example | | | |
|---|---|---|---|---|
| | 16 | 17 | 18 | 19 |
| Thermal aging test (N/mm) | 1.4 | 1.3 | 1.1 | 1.0 |

TABLE 9

| | Comparative Example | | |
|---|---|---|---|
| | 5 | 6 | 7 |
| F/C | 2.00 | 1.51 | 1.30 |
| O/C | 0 | 0.06 | 0.80 |
| Bond strength (N/mm) | 0.1 | 0.9 | 1.0 |
| Gasoline immersion test (N/mm) | 0 | 0.3 | 0.6 |
| Thermal aging test (N/mm) | 0 | 0.7 | 0.7 |

It is apparent from Tables 4–9 that all the fuel hoses of Examples 1–19 with F/C and O/C ratios within the specified ranges had sufficient initial bond strength values (≧1.2 N/mm) required of fuel hoses. Moreover, these hoses retained sufficient bond strength values even after gasoline immersion and after thermal aging. It is, therefore, clear that the fuel hose of this invention has a structural strength sufficient for the intended service and is a high performance hose without the risk of obstruction. In contrast, the fuel hoses of Comparative Examples 1–7 which were outside of the specified ranges of F/C and O/C ratios were remarkably low in bond strength (<1.2 N/mm). Moreover, they showed further decreases in bond strength in the gasoline immersion test and in the thermal aging test and particularly in the fuel hoses of Comparative Examples 1, 3 and 5, a delamination occurred between the tubular inner ply and the outer ply.

Figure 11:
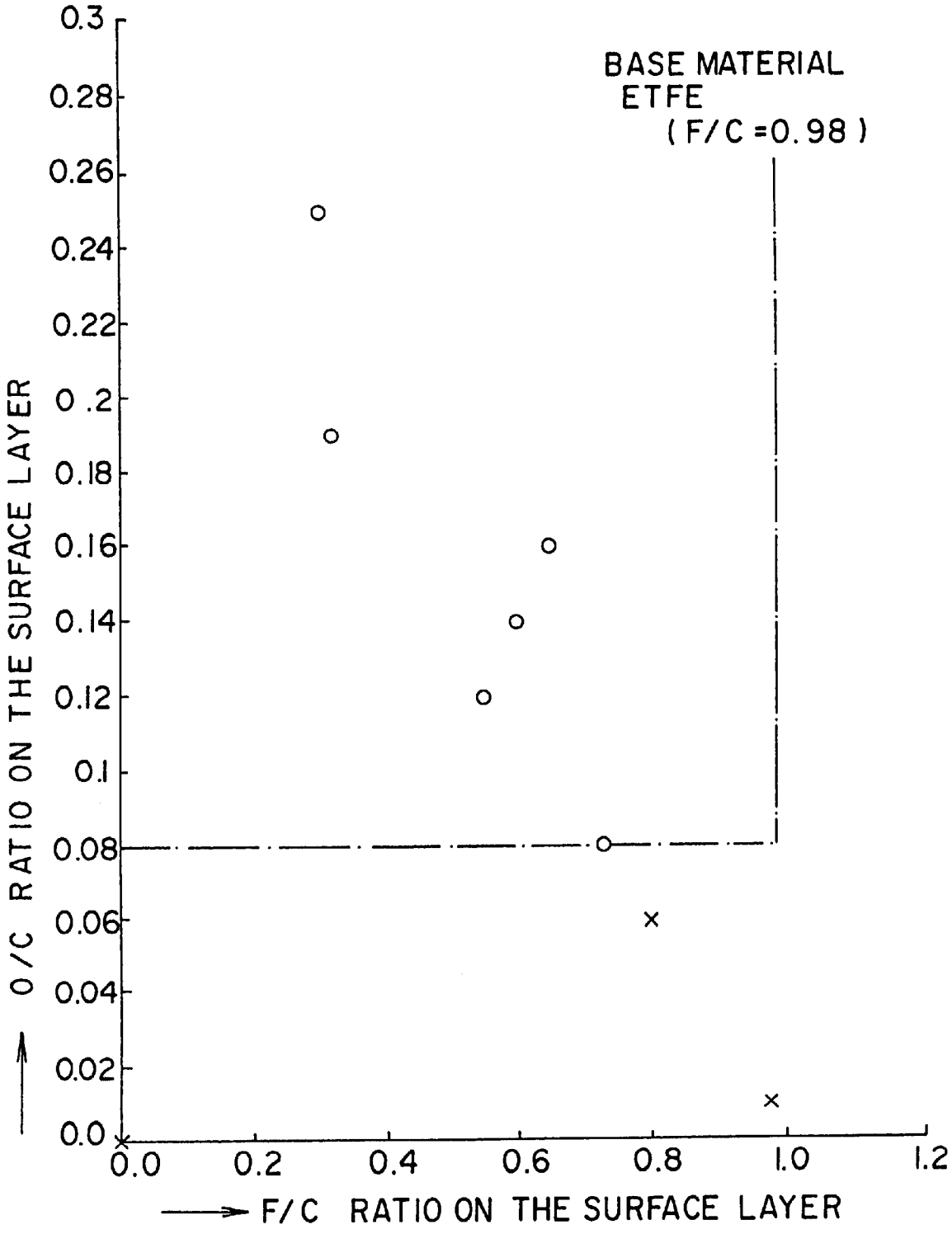
FIG. 11 is a diagrammatic representation of the relationship between F/C ratio and O/C ratio in the treated layer of the tubular fluororesin inner ply of a fuel hose according to this invention.
Figure 12:
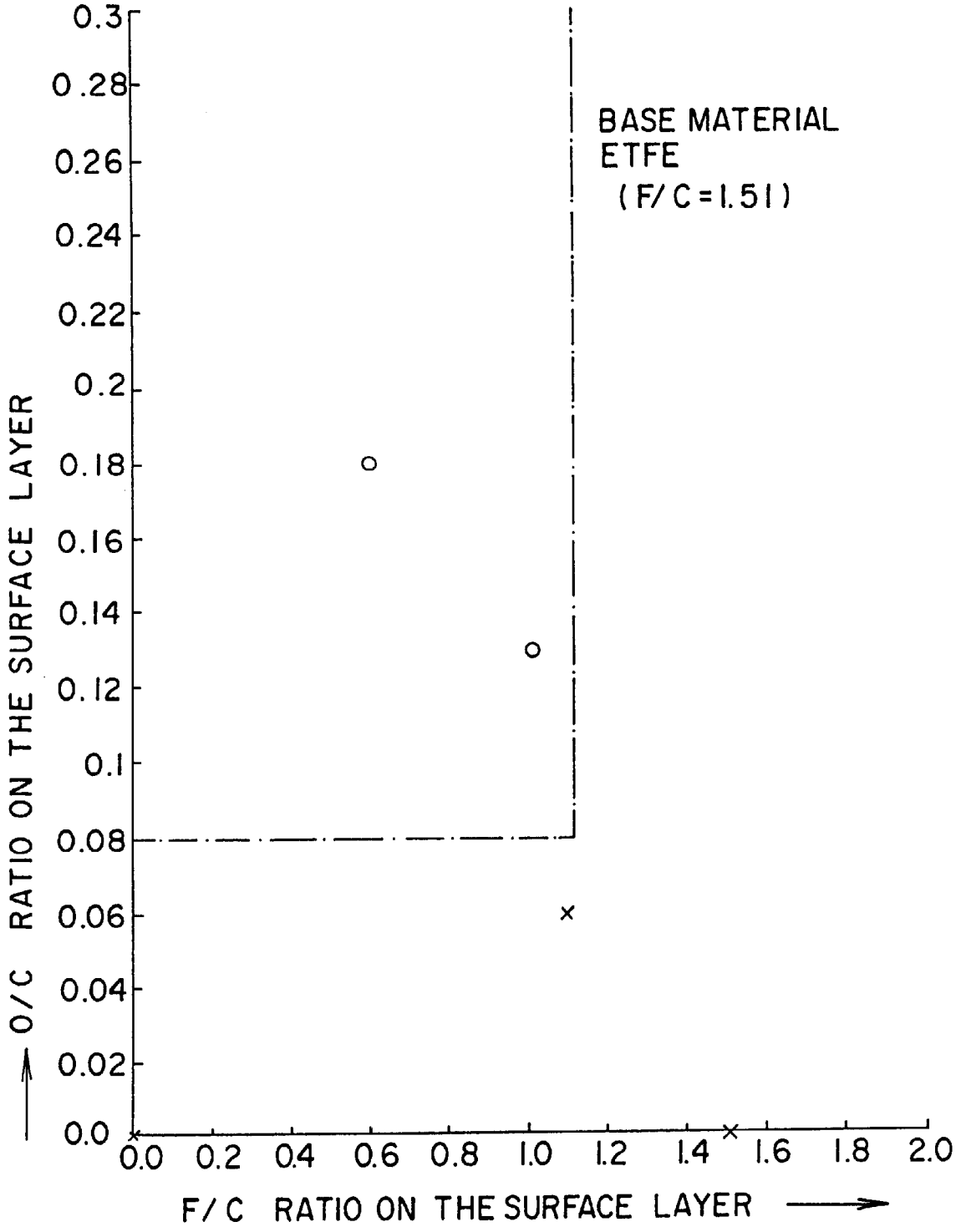
FIG. 12 is a diagrammatic representation of the relationship between F/C ratio and O/C ratio in the treated layer of the tubular fluororesin inner ply of a fuel hose according to this invention.
Figure 13:
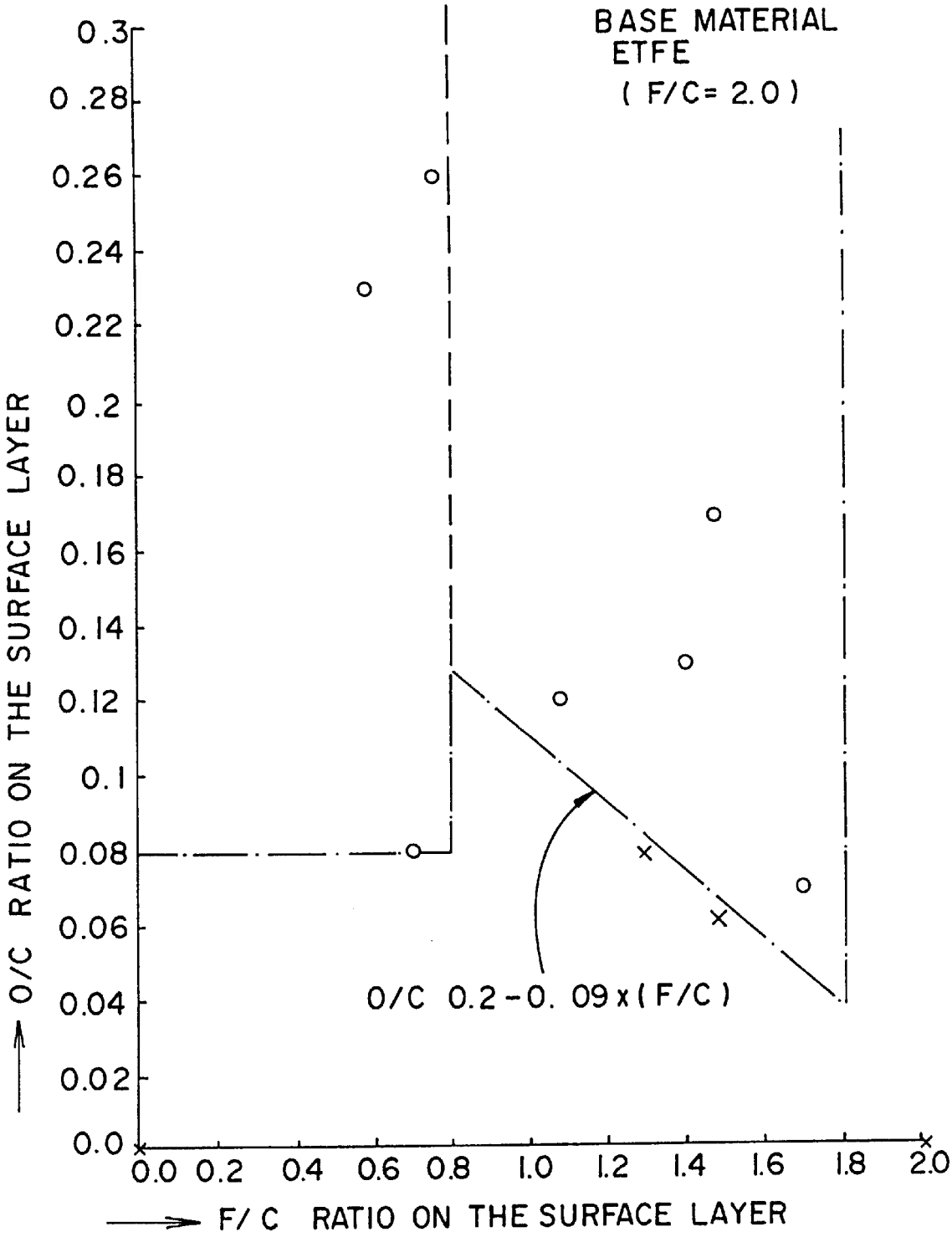
FIG. 13 is a diagrammatic representation of the relationship between F/C ratio and O/C ratio in the treated layer of the tubular fluororesin inner ply of a fuel hose according to this invention.
Figure 14:
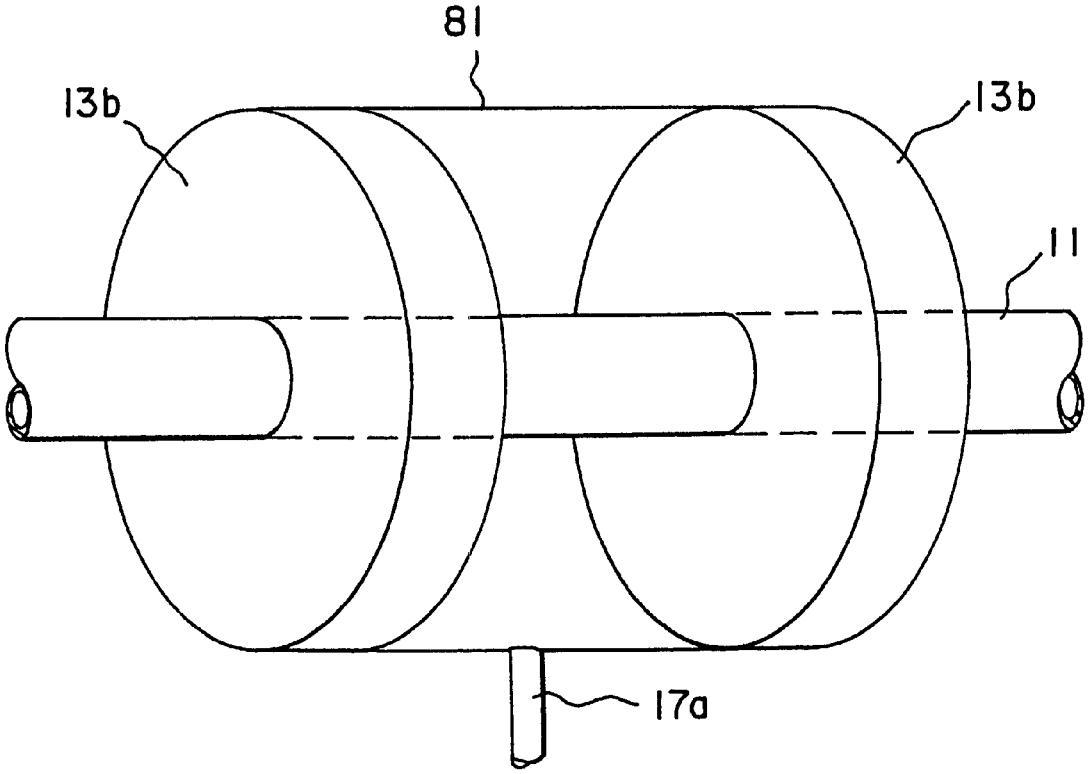
FIG. 14 is an elementary view illustrating an alternative seal means of the vacuum plasma equipment of this invention.

Based on the results for the above Examples 1–19 and Comparative Examples 1–7, the relation of F/C and O/C ratios of the treated layer of the tubular fluororesin ply with the bond strength between the two plies was plotted as shown in FIGS. 11, 12 and 13.

The diagram of FIG. 11 represents the data of Examples 1–6, Examples 16 and 17, and Comparative Examples 1 and 2 in which ETFE (F/C=0.98) was used as the fluororesin. In the diagram, O means a bond strength of not less than 1.2 N/mm and x means a bond strength of less than 1.2 N/mm. The upper area (A) demarcated by a dot-dash line represents the range of treated layer (A) of this invention (corresponding to the invention of Claim 1). It is clear from the diagram that the bond strength is ≧1.2 N/mm in the range of treated layer (A).

The diagram of FIG. 12 shows the results for Examples 7 and 8 and Comparative Examples 3 and 4 in which CTFE (F/C=1.51) was used as the fluororesin. In this diagram, o means a bond strength of not less than 1.2 N/mm and x means a bond strength of less than 1.2 N/mm. The upper area (A) demarcated by a dot-dash line represents the range of treated layer (A) of this invention (corresponding to the invention of Claim 1). It is clear from the diagram that the bond strength is ≧1.2 N/mm in the range of treated layer (A).

The diagram of FIG. 13 shows the results for Examples 9–15, Examples 18 and 19, and Comparative Examples 5–7 in which FEP (F/C=2.0) was used as the fluororesin. In the diagram, O means a bond strength of not less than 1.2 N/mm and x means a bond strength of less than 1.2 N/mm. The upper area (B) demarcated by a dot-dash line in the diagram represents the range of treated layer (B) of this invention (corresponding to the invention of Claim 6). In the diagram, the left-hand area demarcated by a dot-dash line within the above range (B) represents the range (a) of treated layer (B) of this invention, while the right-hand area demarcated by a dot-dash line represents the range (b) of treated layer (B) of this invention. The inclined segment of this dot-dash line is the borderline defined by the relation (1) mentioned hereinbefore. It is clear from the diagram that the bond strength is ≧1.2 N/mm within the range of treated layer (B).

EXAMPLE 20

A fuel hose was fabricated in the same manner as Example 1 except that the mandrel was not used. As a result, despite the thickness of the tubular ETFE inner ply being as small as 0.25 mm, the ply did not collapse but retained its tubular shape. Moreover, this tubular ETFE inner ply could be successfully subjected to vacuum plasma treatment and formation of an outer layer on its periphery. Moreover, because the step of slipping out a mandrel was dispensed with, the fuel hose could be produced with good efficiency.

EXAMPLE 21

After the vacuum plasma,treatment of a tubular ETFE inner ply, a silane adhesive was applied and an outer ply was extruded over the periphery of the adhesive layer. Otherwise the procedure of Example 1 was repeated to provide a fuel hose. The bond strength of this fuel hose was as high as 6.8 N/mm.

The following examples and comparative examples are intended to describe the vacuum plasma apparatus of this invention in further detail.

EXAMPLES 22–35

The outer diameter of the tubular fluororesin inner ply was set to 6.5 mm, while the rubber-like elastomer seal element geometry, rubber hardness, rubber material and mandrel supply speed were as shown in Tables 10 and 11. Otherwise the procedure of Example 1 was repeated to fabricate fuel hoses. The plasma condition during production of each fuel hose was evaluated and the bond strength of each hose was determined by the method described hereinbefore. The results are shown in the same table, In the evaluation of plasma condition, the case in which a stable plasma was established by glow discharge was rated as o and the case in which an abnormality of plasma developed was rated as x. Moreover, in the above determination of bond strength, the case in which the bond strength was not less than 1.2 N/mm was rated as O and the case in which the bond strength was less than 1.2 N/mm was rated as x.

TABLE 10

| | Example | | | | | | |
|---|---|---|---|---|---|---|---|
| | 22 | 23 | 24 | 25 | 26 | 27 | 28 |
| Seal geometry* | A | A | A | B | A | A | A |
| Rubber hardness (JIS A) | 45 | 50 | 60 | 60 | 70 | 80 | 60 |
| Type of Rubber | Silicone rub- | Silicone rub- | Silicone rub- | Silicone rub- | Silicone rub- | Silicone rub- | Silicone rub- |

TABLE 10-continued

| | Example | | | | | | |
|---|---|---|---|---|---|---|---|
| | 22 | 23 | 24 | 25 | 26 | 27 | 28 |
| | ber | ber | ber | ber | ber | ber | ber |
| Speed of mandrel feed (m/min.) | 15 | 15 | 15 | 15 | 15 | 15 | 5 |
| Plasma condition | ○ | ○ | ○ | ○ | ○ | ○ | ○ |
| Bond strength | ○ | ○ | ○ | ○ | ○ | ○ | ○ |

Figure 6:
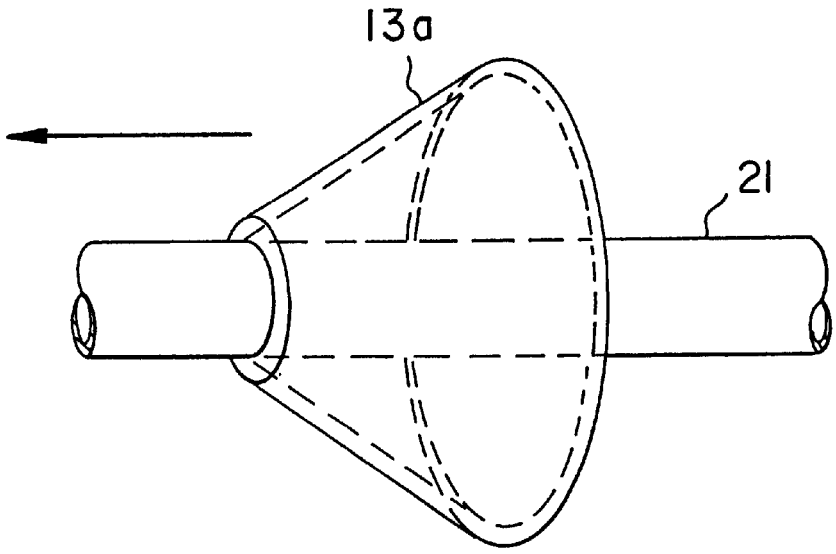
FIG. 6 is an elementary view illustrating a sealing element for the vacuum plasma apparatus of this invention.
Figure 7:
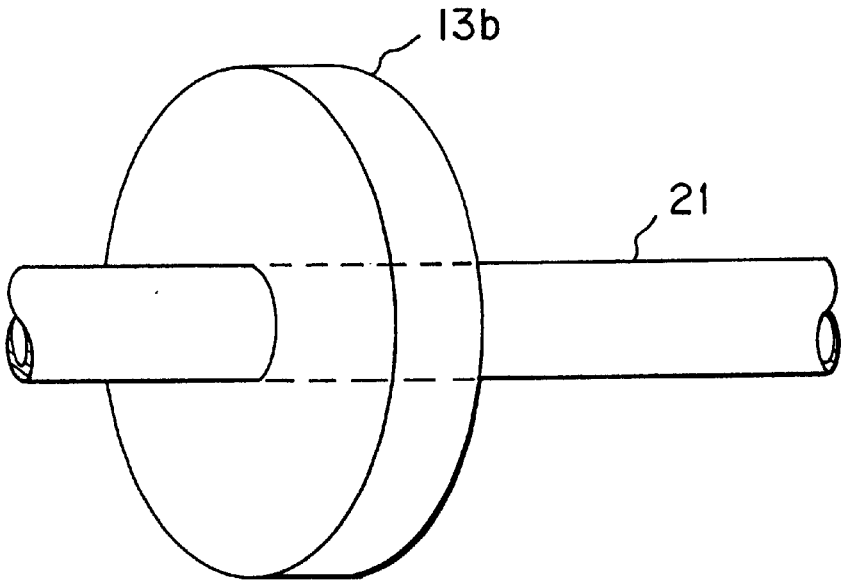
FIG. 7 is an elementary diagram illustrating an alternative seal element for the vacuum plasma apparatus of this invention.
Figure 8:
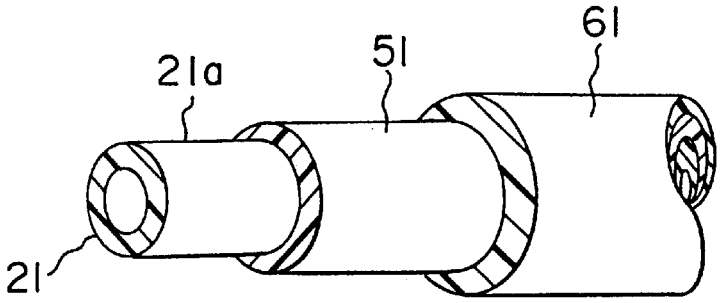
FIG. 8 is an elementary view showing an embodiment of the fuel hose of this invention which is provided with a sheath ply.
Figure 9:
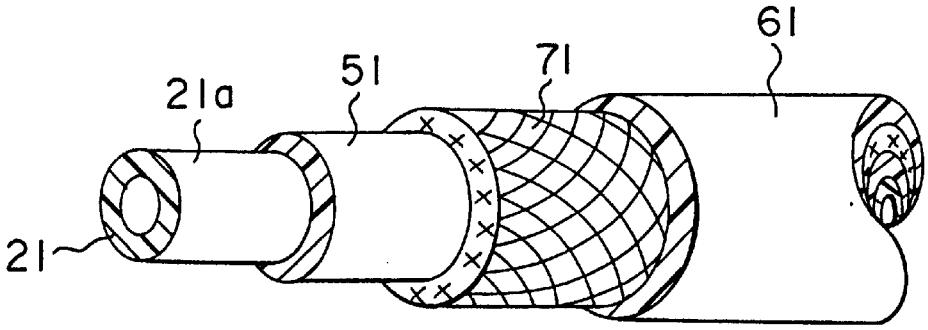
FIG. 9 is an elementary view showing an embodiment of the fuel hose of this invention which is provided with a reinforcing cord ply and a sheath ply.

*: Seal geometry A is as illustrated in FIG. 6; seal geometry B is as illustrated in FIG. 7.

TABLE 11

| | Example | | | | | | |
|---|---|---|---|---|---|---|---|
| | 29 | 30 | 31 | 32 | 33 | 34 | 35 |
| Seal geometry* | A | B | A | A | B | A | A |
| Rubber hardness (JIS A) | 60 | 60 | 60 | 60 | 60 | 50 | 70 |
| Type of Rubber | Silicone rubber | Silicone rubber | Silicone rubber | NBR ber | NBR ber | NBR ber | NBR ber |
| Speed of mandrel feed (m/min.) | 10 | 10 | 25 | 15 | 15 | 15 | 15 |
| Plasma condition | ○ | ○ | ○ | ○ | ○ | ○ | ○ |
| Bond strength | ○ | ○ | ○ | ○ | ○ | ○ | ○ |

*: Seal geometry A is as illustrated in FIG. 6; seal geometry B is as illustrated in FIG. 7.

It is apparent from the data in the above Tables 10 and 11 that a stable plasma could be generated in all the Examples and that the bond strengths of the resulting fuel hoses were invariably ≧1.2 N/mm. It is, therefore, clear that the vacuum plasma apparatus of this invention is highly air-tight and capable of performing a satisfactory plasma treatment even when the tubular fluororesin inner ply is fed to and withdrawn from it at a high speed.

EXAMPLE 36

Figure 5:
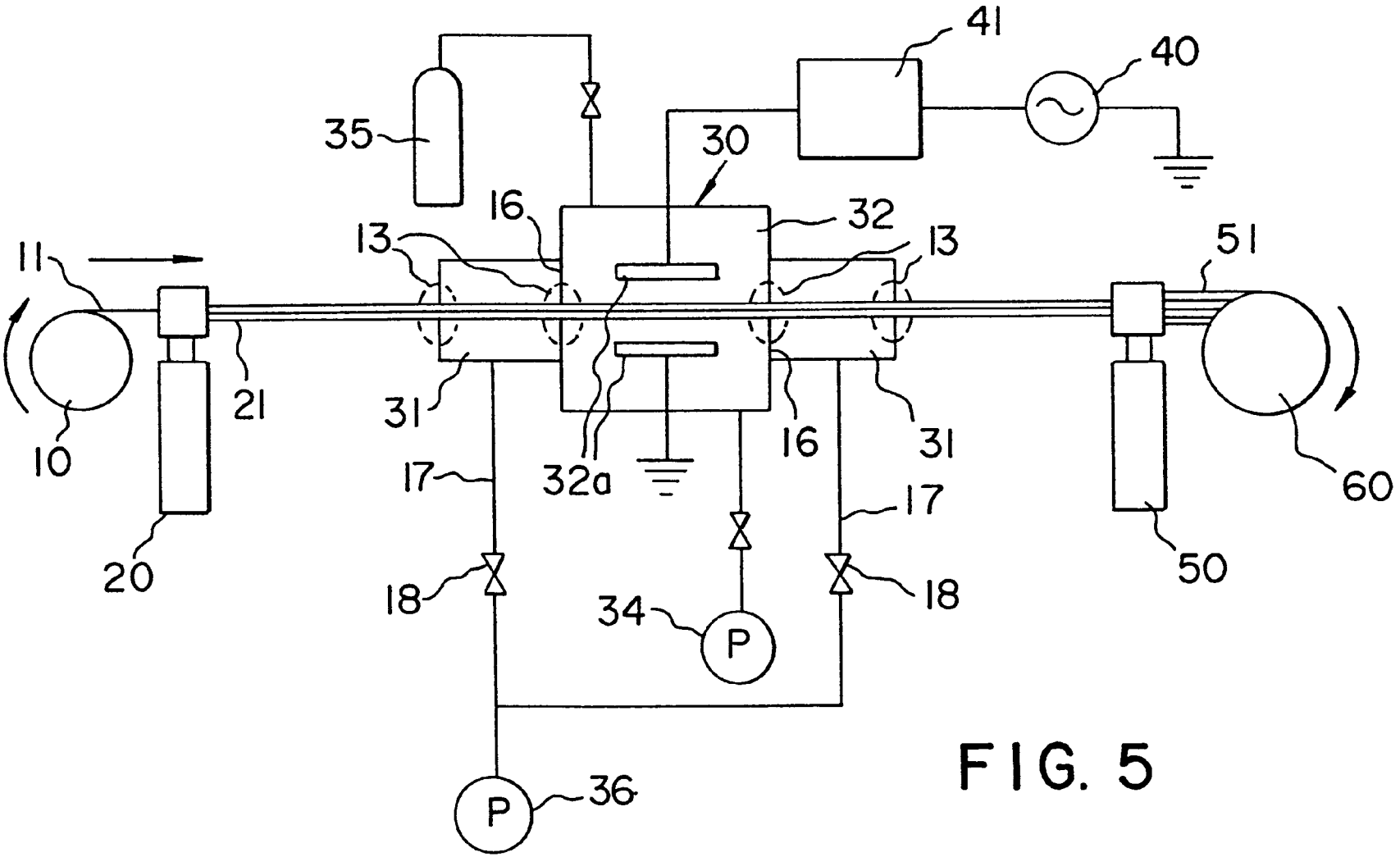
FIG. 5 is a schematic diagram illustrating an embodiment in which a vacuum plasma apparatus having auxiliary vacuum chambers is used in the method for producing a fuel hose in accordance with this invention.

A fuel hose was fabricated using the vacuum plasma apparatus having seal chambers (auxiliary vacuum chambers) illustrated in FIG. 5. The rubber elements used for sealing the auxiliary vacuum chambers 31 were silicone rubber elements with a hardness of 60 (JIS A). Otherwise the procedure of Examples 22–35 was repeated to fabricate a fuel hose. The plasma condition during the production was evaluated and the bond strength of the resulting fuel hose determined in the same manner as above. The plasma condition during production was very stable and the fuel hose had a bond strength of ≧1.2 N/mm.

What is claimed is:

1. A fuel hose comprising a tubular fluororesin inner ply having an F/C ratio ≦1.6, the outer surface of which is modified to have an oxygen-containing layer having an F/C ratio of ≦1.12, and an O/C ratio of ≧0.08; and a tubular rubber or thermoplastic resin outer ply; wherein the inner surface of the outer ply is laminated directly onto the outer surface of the inner ply and wherein the initial bond strength of the laminate between the inner and outer plies is not less than 1.2 N/mm.

2. A fuel hose according to claim 1, wherein the outer surface of the inner ply was modified by a vacuum plasma treatment.

3. A fuel hose according to claim 1 or 2, wherein the thermoplastic resin is a polyamide resin.

4. A fuel hose according to claim 1 or 2, wherein the thickness of the inner ply is 0.05–1.00 mm.

5. A fuel hose according to claim 1 or 2, wherein the tubular fluororesin inner ply is electrically conductive.

6. A fuel hose according to claim 5, wherein the tubular fluororesin inner ply is a multi-layer ply at least one layer of which is electrically conductive.

7. A fuel hose comprising a tubular fluororesin inner ply having an F/C ratio of >1.6≦2.0, the outer surface *of* which is modified to have an oxygen-containing layer [having an F/C ratio of 0.8–1.8 and an O/C ratio of >0.2 minus 0.09 times the F/C ratio;] *which is within the combination of the following two relationships* (*a*) *and* (*b*);

(*a*) *when F/C is less than 0.8, then O/C must be not less than 0.08; and*

(*b*) *when F/C is in the range F/C=0.8 to 1.8, then O/C must satisfy the relationship:*

$$O/C>0.2-0.09\times(F/C);$$

and a tubular rubber or thermoplastic resin outer ply; wherein the inner surface of the outer ply is laminated directly onto the outer surface of the inner ply and wherein the initial bond strength of the laminate between the inner and outer plies is not less then 1.2 N/mm.

8. A fuel hose according to claim 7, wherein the outer surface layer of the inner tubular ply was modified by a vacuum plasma treatment.

9. A fuel hose according to claim 7 or 8, wherein the thermoplastic resin is a polyamide resin.

10. A fuel hose according to claim 7 or 8, wherein the thickness of the inner ply is 0.05–1.00 mm.

11. A fuel hose according to claim 7 or 8, wherein the tubular fluororesin inner ply is electrically conductive.

12. A fuel hose according to claim 11, wherein the tubular fluororesin inner ply is a multi-layer ply at least one layer of which is electrically conductive.

13. A fuel hose according to claims 1, 2, 7 or 8, which further comprises a rubber or elastomer sheath overlying the outer surface of the outer ply.

14. A fuel hose according to any of claims 1, 2, 7 or 8, which further comprises a reinforcing cord ply between the rubber or elastomer sheath and the outer surface of the outer ply.

15. A method of producing a fuel hose comprising a rubber or thermoplastic resin outer ply laminated directly onto a tubular fluororesin inner ply, which comprises: extrusion-molding a tubular fluororesin, modifying the outer surface of the tubular fluororesin by a vacuum plasma treatment, and extrusion-molding a rubber or thermoplastic resin directly onto the modified surface of the tubular inner ply, *wherein the fluororesin has an F/C ratio of ≦1.6, and the modified outer surface of the tubular fluororesin has an F/C ratio of ≦1.12 and an O/C ratio of ≧0.08.*

[16. A method of producing a fuel hose according to claim 15, wherein the fluororesin has an F/C ratio of ≦1.6, and the modified outer surface of the tubular fluororesin has an F/C ratio of ≦1.12 and an O/C ratio of ≧0.08.]

17. A method of producing a fuel hose [according to claim 15,] *comprising a rubber or thermoplastic resin outer ply laminated directly onto a tubular fluororesin inner ply, which comprises: extrusion-molding a tubular fluororesin, modifying the outer surface of the tubular fluororesin by a vacuum plasma treatment, and extrusion-molding a rubber or thermoplastic resin directly onto the modified surface of the tubular inner ply,* wherein the fluororesin has an F/C ratio of >1.6≦2.0, and the outer modified surface of the tubular fluororesin contains oxygen and [has an F/C ratio of 0.8–1.8 and an O/C ratio of >0.2 minus 0.09 times the F/C ratio] *is within the combination of the following two relationships* (*a*) *and* (*b*);

(*a*) *when F/C is less than 0.8, then O/C must be not less than 0.08; and*

(*b*) *when F/C is in the range F/C=0.8–1.8, then O/C must satisfy the relationship:*

$$O/C>0.2-0.09\times(F/C).$$

18. The method of producing a fuel hose according to claim 15, wherein the thermoplastic resin outer ply is formed by melting a thermoplastic resin, extruding the molten thermoplastic resin onto the outer surface of the tubular inner ply, and cooling the extruded thermoplastic resin to solidify and adhere the thermoplastic resin to the outer surface of the tubular inner ply.

19. A method of producing a fuel hose according to claim 15, wherein the thermoplastic resin is a polyamide resin.

20. A method of producing a fuel hose according to claim 15, wherein the thickness of the inner ply is 0.05–1.00 mm.

*21. The method of producing a fuel hose according to claim 17, wherein the thermoplastic resin outer ply is formed by melting a thermoplastic resin onto the outer surface of the tubular inner ply, and cooling the extruded thermoplastic resin to solidify and adhere the thermoplastic resin to the outer surface of the tubular inner ply.*

*22. A method of producing a fuel hose according to claim 17, wherein the thermoplastic resin is a polyamide resin.*

*23. A method of producing a fuel hose according to claim 17, wherein the thickness of the inner ply is 0.05–1.00 mm.*

* * * * *